US006845900B2

(12) United States Patent
Fairchild et al.

(10) Patent No.: US 6,845,900 B2
(45) Date of Patent: Jan. 25, 2005

(54) METHODS FOR PRODUCING WELD JOINTS HAVING THERMALLY ENHANCED HEAT-AFFECTED-ZONES WITH EXCELLENT FRACTURE TOUGHNESS

(75) Inventors: Douglas P. Fairchild, Sugar Land, TX (US); Ali M. Farah, Missouri City, TX (US); Daniel B. Lillig, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 86 days.

(21) Appl. No.: 10/440,658

(22) Filed: May 19, 2003

(65) Prior Publication Data

US 2003/0218056 A1 Nov. 27, 2003

Related U.S. Application Data

(60) Provisional application No. 60/382,176, filed on May 21, 2002.

(51) Int. Cl.[7] .............................................. B23K 31/02

(52) U.S. Cl. ........................ 228/165; 228/178; 228/196

(58) Field of Search ................................ 228/165, 169, 228/178, 196, 256; 219/76.1, 76.12

(56) References Cited

U.S. PATENT DOCUMENTS

| | | | |
|---|---|---|---|
| 1,554,546 A | 9/1925 | Austin | |
| 4,219,717 A | 8/1980 | Kuhnen | 219/61 |
| 4,742,207 A | 5/1988 | Nakashima et al. | 219/125.1 |
| 5,173,592 A | 12/1992 | Okumura et al. | 219/125.1 |
| 5,760,365 A * | 6/1998 | Milewski et al. | 219/121.64 |
| 6,479,796 B2 | 11/2002 | Goto et al. | 219/145.22 |
| 2003/0218056 A1 * | 11/2003 | Fairchild et al. | 228/175 |

OTHER PUBLICATIONS

D. P. Fairchild, "Local Brittle Zones in Structural Welds", *Welding Metallurgy of Structural Steels*, The Metallurgical Society, Warrendale, PA 1987, pp. 303–318.
S. E. Webster and E. F. Walker, "The Significance of Local Brittle Zones to the Integrity of Large Welded Structures", 7th International Conference of Offshore Mechanics and Arctic Engineering, Houston, TX, Feb. 1988, pp. 395–403.
D. P. Fairchild, "Fracture Toughness Testing of Weld Heat–Affected Zones in Structural Steel", *Fatigue and Fracture Testing of Weldments*, ASTM STP 1058, 1990, pp. 117–141.
D. P. Fairchild, et al., "A Study Concerning Intercritical HAZ Microstructure and Toughness in HSLA Steels", *Welding Research, Supplement to the Welding Journal*, Dec. 1991, pp. 321–329.
K. Uchino and Y. Ohno, "A Study of Intercritical HAZ Embrittlement in HT50 for Offshore Structural Use", 6th International Conference of Offshore Mechanics and Arctic Engineering, Houston, TX, Mar. 1–7, 1987, pp. 159–165.
J. H. Chen, et al., "Micro–Fracture Behaviour Induced by M–A Constituent (Island Martensite) in Simulated Welding Heat Affected Zone of HT80 High Strength Low Alloyed Steel", *Acta metall.*, vol. 32, No. 10, 1984, pp. 1779–1788.
S. Aihara and T. Haze, "Influence of High–Carbon Martensitic Island on Crack–tip Opening Displacement Value of Weld Heat–Affected Zone in HSLA Steels", TMS Annual Meeting, Phoenix, AZ, Jan. 25–28, 1988, pp. 1–13.

(List continued on next page.)

*Primary Examiner*—Kiley S. Stoner

(57) ABSTRACT

Methods of welding two pieces of metal to produce a weld joint having excellent fracture toughness are provided. Two pieces of metal are positioned for welding so as to form a narrow weld groove having two sidewalls with bevel angles of less than about 10°. Two or more layers are applied to the weld groove to produce the weld joint such that the heat-affected-zone of the weld joint is substantially free of rogue grains.

5 Claims, 16 Drawing Sheets

OTHER PUBLICATIONS

T. Haze and S. Aihara, "Influence of Toughness and Size of Local Brittle Zone on HAZ Toughness of HSLA Steels", 7$^{th}$ International Conference of Offshore Mechanics and Arctic Engineering, Houston, TX, Feb. 7–12, 1988, pp. 515–523.

C. L. Davis and J. E. King, "Cleavage Initiation in the Intercritically Reheated Coarse–Grained Heat–Affected Zone: Part I. Fractographic Evidence", *Metallurgical and Materials Transactions A*, vol. 25A, Mar. 1994, pp. 563–573.

A. C. deKoning, et al., "Feeling Free Despite LBZ", 7$^{th}$ International Conference of Offshore Mechanics and Arctic Engineering, Houston, TX, Feb. 7–12, 1988, pp. 161–179.

K. Olsen, et al., "Weld Bead Tempering of the Heat–Affected Zone", *Scandinavian Journal of Metallurgy*II, 1982, pp. 163–168.

P. J. Alberry, "Simple Test Reveals Level of Two–Layer Refinement", *Welding and Metal Fabrication*, Nov., 1981, pp. 543–547.

* cited by examiner

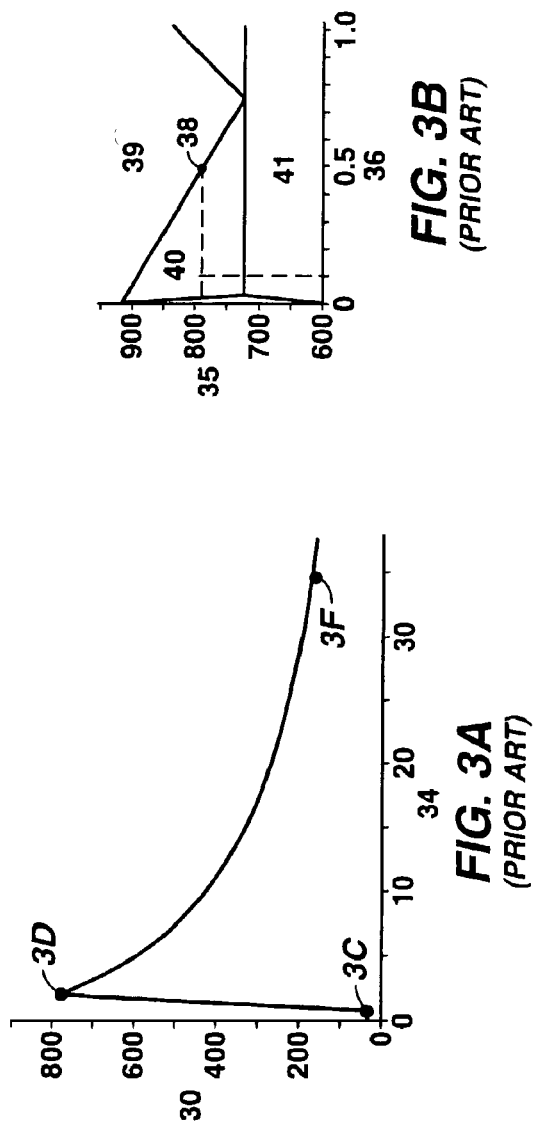
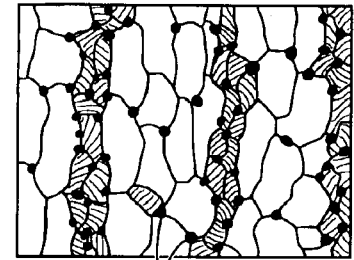
FIG. 3B (PRIOR ART)
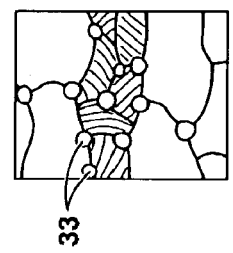
FIG. 3E (PRIOR ART)
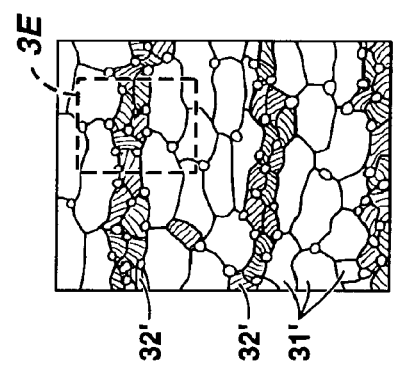
FIG. 3F (PRIOR ART)
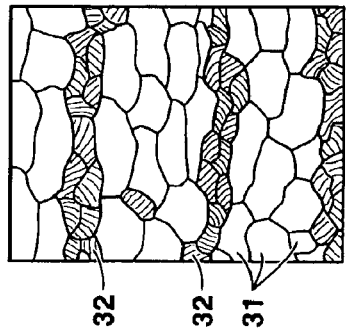
FIG. 3A (PRIOR ART)
FIG. 3C (PRIOR ART)
FIG. 3D (PRIOR ART)

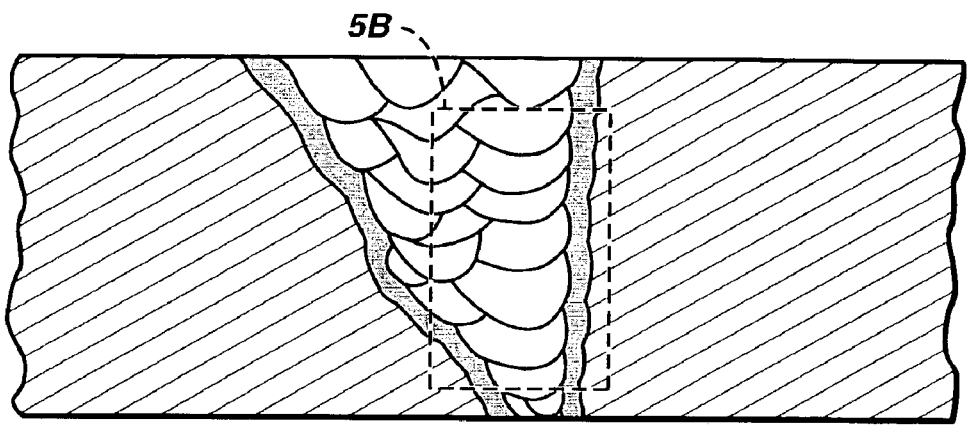
FIG. 5A
*(PRIOR ART)*
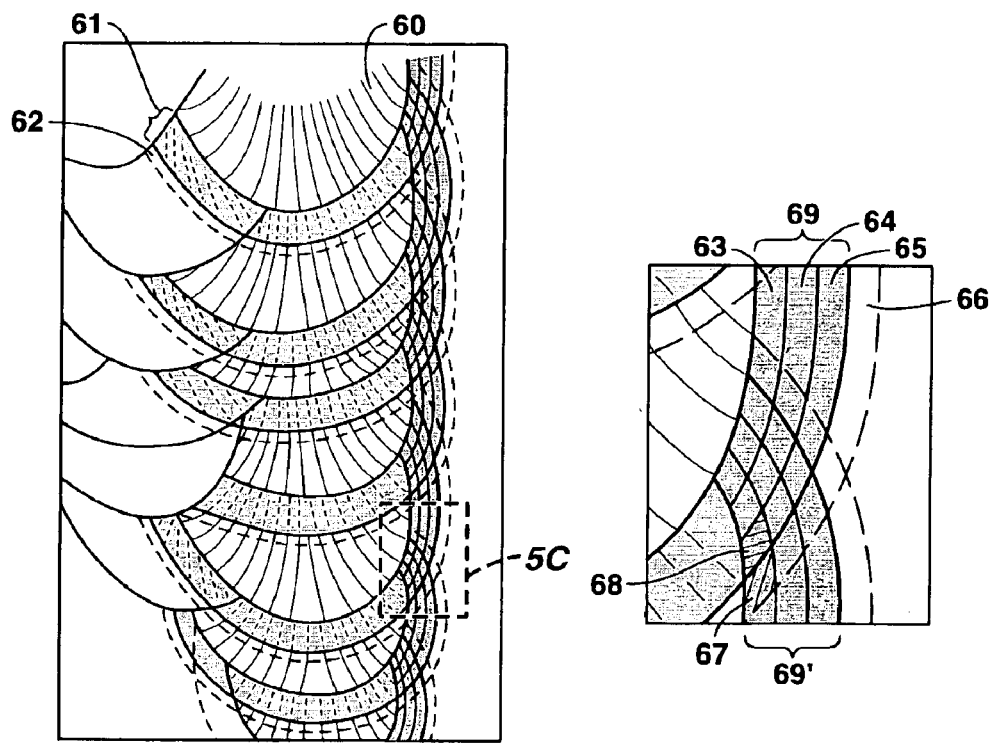
FIG. 5B
*(PRIOR ART)*
FIG. 5C
*(PRIOR ART)*

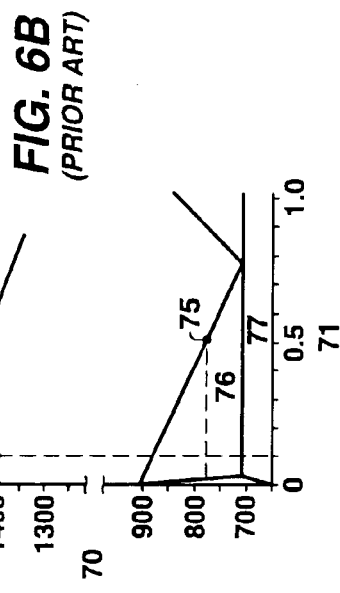
FIG. 6B (PRIOR ART)
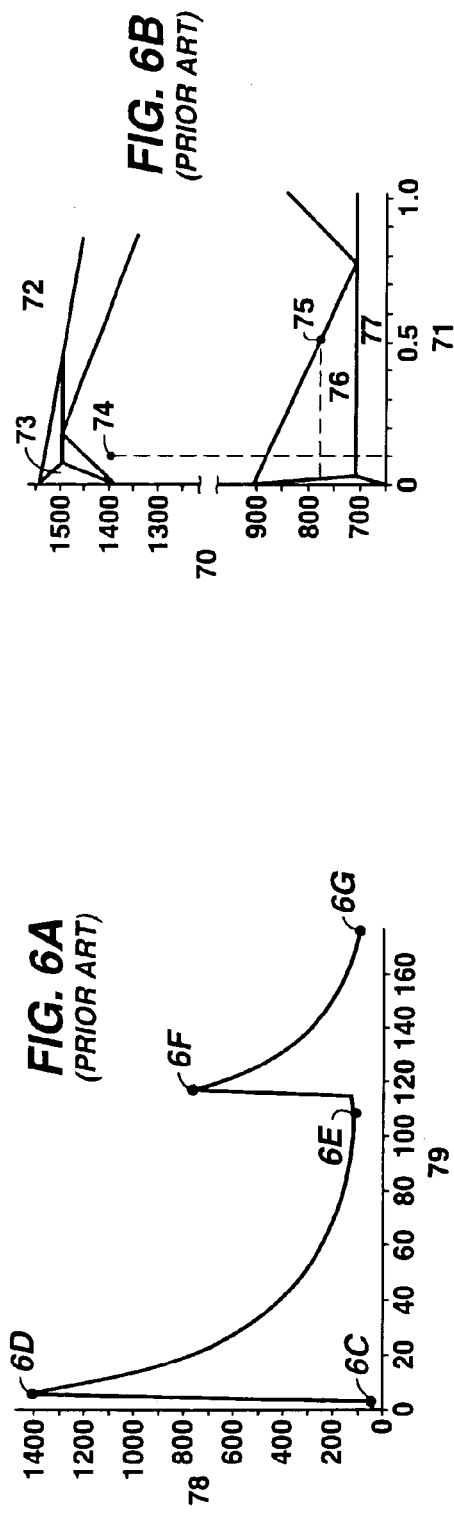
FIG. 6A (PRIOR ART)
FIG. 6C (PRIOR ART)
FIG. 6D (PRIOR ART)
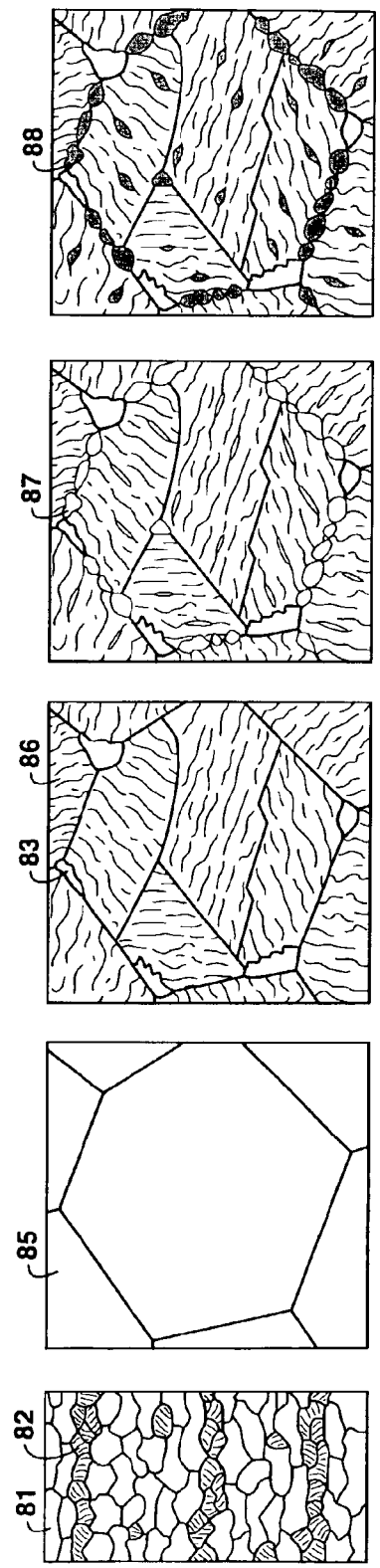
FIG. 6E (PRIOR ART)
FIG. 6F (PRIOR ART)
FIG. 6G (PRIOR ART)

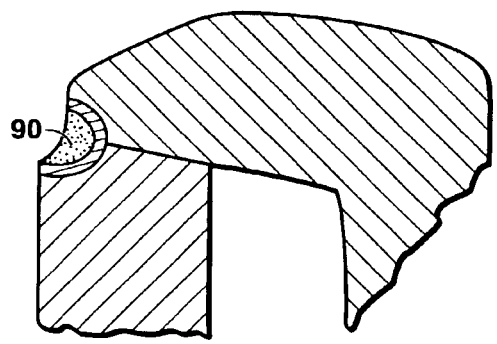
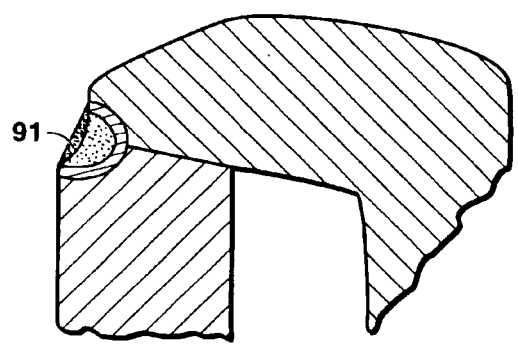
FIG. 7
*(PRIOR ART)*
FIG. 8
*(PRIOR ART)*
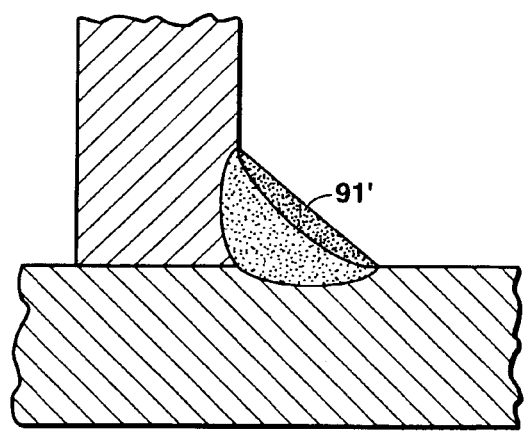
FIG. 9
*(PRIOR ART)*
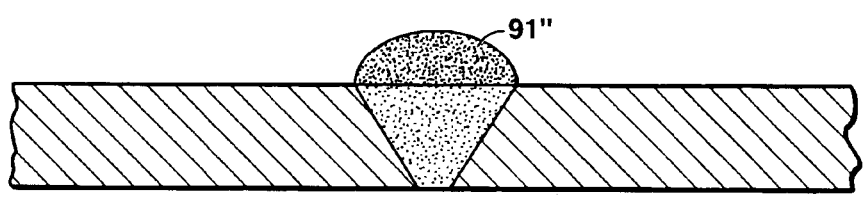
FIG. 10
*(PRIOR ART)*

METHODS FOR PRODUCING WELD JOINTS HAVING THERMALLY ENHANCED HEAT-AFFECTED-ZONES WITH EXCELLENT FRACTURE TOUGHNESS

This application claims the benefit of U.S. Provisional Application No. 60/382,176, filed May 21, 2002.

FIELD OF THE INVENTION

This invention relates generally to the field of welding steels. More particularly, the invention pertains to methods for producing weld joints having thermally enhanced heat affected zones with excellent fracture toughness.

BACKGROUND OF THE INVENTION

Various terms are defined in the following specification. For convenience, a Glossary of Terms is provided herein, immediately preceding the claims. As used herein, the terms "bead", "weld bead", "pass" and "weld pass" are synonymous, all of which terms are familiar to those skilled in the art of welding engineering. When used as a noun herein, the term "weld" means the same as "weld joint", as will be familiar to those skilled in the art of welding engineering. A Table of References follows the Glossary of Terms. All REF. numbers referred to herein are identified in the Table of References. All publications listed in the Table of References are hereby incorporated herein by reference.

Steel is a widely used structural material in a variety of industries because of its low cost, desirable physical properties, and versatility through alloying, thermomechanical processing, and heat treatment. Within the past 10 to 15 years, significant advancements in steel making have enabled improved combinations of strength and toughness. Despite these advancements and continued broad use, one pitfall in the use of steel persists, the potential for low toughness and structural failure.

There are three primary reasons that the risk of low toughness persists. First, end users have responded to steel making improvements by selecting new, improved steels for more severe service conditions, e.g., applications that are less tolerant of oversights or unfortunate mishaps. Second, structural steel is a material with a body centered cubic crystal structure, therefore it displays a change from ductile behavior to brittle behavior as temperature is decreased. This aspect can be quantified by defining a ductile-to-brittle transition temperature (DBTT) which is a mathematical description of the position of the transition region on the temperature axis. FIG. 1 (Prior Art) shows a toughness transition curve 1 and the DBTT 2 is shown as the boundary between the upper transition region 3 and lower transition region 4. FIG. 1 has ordinate 5 representing increasing toughness and abscissa 6 representing increasing temperature. Lower shelf toughness region 7 and upper shelf toughness region 6 are also shown. Region 9 where cleavage (brittle) fracture may occur, region 10 where mixed mode fracture may occur, and region 11 where ductile fracture may occur, are also shown. The third reason that low toughness remains an issue is that the primary method used to join structural steel is fusion welding; and weldments, as compared to the highly processed base metal, often contain defects and degraded microstructures. Of particular concern is the toughness of the heat-affected zone (HAZ), a region adjacent to the fused weld metal where the base metal has experienced microstructural changes due to the heat from welding.

The coarse grain regions in certain areas of a multipass weld HAZ can be responsible for low toughness properties. As is explained below, these regions can be small and surrounded by material with relatively good toughness. A term used to describe small HAZ regions with low toughness is local brittle zones (LBZs). The topic of HAZ toughness in structural steels has received considerable attention in the literature, for example in REF. numbers 1 through 5. The annual Offshore Mechanics and Arctic Engineering conference proceedings is another example of literature on this topic, e.g., REF. numbers 3, 7, 10, and 12.

The Nature of Steel Heat-Affected Zones: Single Pass Welds

The microstructural formation of steel HAZs will be explained with an emphasis on material toughness. Mechanisms of toughness degradation due to metallurgical changes in steel HAZs fall into two general categories; (1) changes that hinder slip deformation, (2) changes that provide more potent cleavage initiation sites. Additional discussion about cleavage mechanisms in steel can be found in REF. number 5.

Single pass HAZs in steel can be divided into four regions based on the peak temperature reached during welding and its relation to the iron-carbon phase diagram. FIG. 2 (Prior Art) shows a hypothetical example of the four regions of a single pass HAZ for a steel with 0.10 wt % carbon content. The subcritical HAZ (SCHAZ) 15 undergoes only subtle changes due to its relatively low peak temperature. The high temperature boundary 12 of the SCHAZ 15 is the $A_1$ transformation temperature and, therefore, the gross microstructure of the SCHAZ 15 remains untransformed. The low temperature boundary 14 is somewhat arbitrary and is not associated with any specific detail of the iron-carbon phase diagram. Low temperature boundary 14 is generally considered to be a temperature below which no significant changes occur to the original base metal. The definition of "significant" depends on the structural application. Metallurgical changes in the SCHAZ 15 are typically related to carbon/nitrogen diffusion, precipitation phenomena, and/or dislocation movement. These changes can be beneficial, benign, or detrimental to toughness depending on the specific steel and HAZ thermal cycle.

The intercritical HAZ (ICHAZ) 16 has the $A_1$ transformation temperature and the $A_3$ transformation temperature as its lower temperature boundary 12 and upper temperature boundary 18, respectively. In the ICHAZ 16, austenite will nucleate and grow during the higher temperature portions of the weld thermal cycle. The amount of austenite formation is small in regions near lower temperature boundary 12 of the ICHAZ 16 and is large (consuming most, if not all, of the microstructure) near upper temperature boundary 18. The properties of the ICHAZ 16 depend greatly on what the austenite transforms to upon cooling. The parts of the ICHAZ 16 that do not undergo much transformation to austenite can still experience significant diffusion of carbon, nitrogen, other alloys, and dislocation movement. The phase diagram shown in FIG. 2 has ordinate 13 representing temperature in ° C. and abscissa 17 representing weight percent carbon. Ferrite plus cementite region 22, alpha ferrite region 28, ferrite plus austenite region 19, austenite plus cementite region 27, austenite region 25, liquid plus austenite region 23, delta ferrite region 29, and liquid region 21 are also shown.

One mechanism of reduced toughness in the ICHAZ 16 is when the newly formed austenite transforms to a hard/brittle constituent on cooling. See, e.g., REF. numbers 5 through 7. FIGS. 3A–3F are from REF. number 5 and they provide schematics that describe this phenomena in a hypothetical ferrite-pearlite steel of about 0.10 wt % carbon. FIG. 3A shows a HAZ thermal cycle plotted on a graph having ordinate 30 representing temperature in ° C. and abscissa 34 representing time in seconds. The microstructure that exists at each of the three points indicated is shown in FIG. 3C–FIG. 3F. FIG. 3B shows a section of the iron-carbon phase diagram to explain the chemistry and microstructural changes in this HAZ region. The microstructure that exists at the point at about ordinate 0, abscissa 0, i.e., prior to welding, is a mixture of ferrite 31 and pearlite 32. During welding, once the temperature rises above the $A_1$ transformation temperature, small "islands" of austenite 33 form within the ferrite 31' and pearlite 32'. These islands of austenite 33 are enriched in carbon well beyond that of the base metal; e.g., islands of austenite 33 have about the carbon content indicated by point 38 in FIG. 3B, which is higher than the about 0.10 wt % carbon of the base metal. FIG. 3B has ordinate 35 representing temperature in ° C. and abscissa 36 representing weight percent carbon. Austenite region 39, ferrite plus austenite region 40, and ferrite plus cementite region 41, are also shown. If the cooling rate is sufficiently fast, the austenite may transform to martensite 37 or martensite-austenite constituent (M-A) 37 and the martensite can have a twinned substructure. This constituent can cause a reduction in toughness.

Referring again to FIG. 2, the fine grain HAZ (FGHAZ) 20 and the coarse grain HAZ (CGHAZ) 24 are adjacent areas that have been heated above the $A_3$ transformation temperature, but below the steel's melting point. In general, the material within the FGHAZ 20 and CGHAZ 24 will transform completely to austenite during the welding thermal cycle, however, for some local areas this is not always the case. Due to chemical and microstructural inhomogenieties, the $A_3$ transformation temperature can vary from point to point in the HAZ. It is possible that some local areas, or maybe just a few isolated grains, will not transform to austenite during the thermal cycle. Depending on the distance from weld fusion line 26, the austenite will grow to varying sizes depending mostly on peak temperature. Lower peak temperatures and smaller grains exist closer to the $A_3$ transformation temperature boundary, and higher temperatures and larger grain sizes exist near the weld fusion line. The distinction between the FGHAZ 20 and CGHAZ 24 is arbitrary because, in reality, there is a continuum of grain sizes between the $A_3$ transformation temperature boundary and the weld fusion line. Upon cooling, the austenite can transform to a number of different microstructures depending on the steel's chemistry and the cooling rate.

The terms "fine grain" or "coarse grain" for the FGHAZ 20 and CGHAZ 24, respectively, refer to the austenite grain size that existed during welding when the temperature was above the $A_3$ transformation temperature. After cooling to ambient temperature, the austenite grains no longer exist, but there is, typically, a prior-austenite grain structure that is observable in an optical microscope. The prior-austenite grain size can have significant effects on HAZ toughness as explained in REF. number 5. The smallest prior-austenite grain size in the FGHAZ 20 can be on the order of a few microns whereas the largest prior-austenite grains in the CGHAZ 24 can be as large as 100 or 200 microns. Low heat input welds (e.g., about 1 kJ/mm) might display sizes of 75 to 100 microns near the weld fusion line. An approximate prior-austenite grain size to delineate the FGHAZ 20 from the CGHAZ 24 is on the order of 50 microns, plus or minus 20 microns, depending on the base metal grain size and the application. In other words, the FGHAZ 20 will contain a range of prior-austenite grain sizes from a few microns up to about 50 microns. The CGHAZ 24 will contain grain sizes from about 50 microns up to the sizes that exist near weld fusion line 26.

The properties of the FGHAZ 20 are dominated by the small grain size and the toughness tends to be very good. Near the low temperature boundary 18 of the FGHAZ 20, where the grain size is smallest, the toughness is often better than in the base metal. In contrast, the CGHAZ 24 is typically the lowest toughness region in a weld. A major factor is the relatively large prior-austenite grain size in the CGHAZ 24, but the final microstructure is significant as well. A range of microstructures can be produced in the CGHAZ 24.

The entire HAZ, from weld fusion line 26 to the outer boundary 14 of the SCHAZ 15, varies in width depending on the weld thermal cycle. For low heat input welds (e.g., less than about 1 kJ/mm) that tend to cool fast, the HAZ may be only a few millimeters wide. For higher heat input welds (e.g., around 3 to 5 kJ/mm) that cool more slowly, the HAZ may be about a centimeter wide. Similarly, the width of any single region, like the CGHAZ 24 or the ICHAZ 16, will be approximately a millimeter, or less, for a low heat input weld up to about a couple of millimeters, for a high heat input weld. When observing a HAZ that has been etched with a common chemical like nitol, only the CGHAZ 24, FGHAZ 20, and ICHAZ 16 show distinct etching. The SCHAZ 15 does not respond to such etchants because its gross microstructure is essentially unchanged (does not transform to austenite).

The Nature of Steel Heat Affected Zones: Multipass Welds

Most weldments in structural steel are multipass where successive beads are deposited one on top of the other. Each bead produces a HAZ that overlaps or crisscrosses some part of the HAZ of the previous pass. FIG. 4A through FIG. 4B (PRIOR ART) provide a schematic of the various regions in a two pass weld 42, including a first weld pass 43 and a second weld pass 44. The purpose of FIGS. 4A and 4B is to identify various HAZ regions including whether or not these regions have been altered by the heat from a subsequent weld pass. Regions 46 and 47 show unaltered HAZs from the first and second weld passes 43 and 44, respectively. Region 49 shows where a portion of the HAZ from the first weld pass 43 existed, but was eliminated by second weld pass 44. Region 48 shows the HAZ from the first weld pass 43 that was altered by the HAZ from the second weld pass 44. FIG. 4B shows that altered HAZ region 48 includes the intercritically reheated CGHAZ (IRCG) 50 and the subcritically reheated CGHAZ (SRCG) 51. FIG. 4B shows some unaltered areas adjacent to altered region 48, including unaltered CGHAZ 52, unaltered CGHAZ 53, unaltered FGHAZ 54, unaltered ICHAZ 55, and unaltered SCHAZ 56. The $A_1$ transformation temperature isotherm 57 and the $A_3$ transformation temperature isotherm 58 are also shown in FIG. 4B.

FIG. 5A through FIG. 5C (PRIOR ART) is a schematic of the various regions in a multipass weld. These regions include columnar weld metal 60, etched HAZ 61 in the weld metal, including CGHAZ, FGHAZ, and ICHAZ and also shows SCHAZ 62 in the weld metal. In somewhat greater detail, FIG. 5C shows unaltered CGHAZ 63, unaltered FGHAZ 64, unaltered ICHAZ 65, unaltered SCHAZ 66, SRCG 67, and IRCG 68. As shown by the markers 69 and 69', the portion of the HAZ that was heated above the $A_1$ transformation temperature can be made visible by etching. FIG. 4A through FIG. 4B and FIG. 5A through FIG. 5C are resketched from the publication, "Recommended Practice for Preproduction Qualification for Steel Plates for Offshore Structures", API RP 2Z, Third Edition, August, 1998. The geometry of the weld shown in FIG. 5A through FIG. 5C is a half-K bevel where one plate edge is left unbeveled. The purpose of this weld geometry is to provide a "straight" HAZ for toughness testing. From a metallurgical standpoint, however, this schematic can be used to highlight the basic principles of multipass HAZ formation in any steel weldment.

FIG. 5A through FIG. 5C show that a multipass weld can produce HAZ regions that are either unaffected (e.g. unaltered areas) or significantly affected by the thermal cycles from subsequent passes. From the standpoint of fracture toughness, the principles previously discussed for single pass welds apply to the unaltered regions of a multipass weld and, usually, apply to subcritically reheated areas. Subcritical reheating generates a relatively low peak temperature, and the microstructure is generally unchanged from the original weld pass. Significant changes due to multipass reheating are typically associated with peak temperatures above the $A_1$ transformation temperature.

The significantly altered regions in a multipass HAZ begin as one of the four single pass regions, and then upon the application of subsequent passes, they experience additional thermal cycles that change the microstructure. With respect to fracture toughness, one region deserves specific attention, the intercritically reheated CGHAZ (IRCG). "A Study Concerning the Heat Affected Zone Toughness of Microalloyed Steels," PhD. Dissertation, D. P. Fairchild, The Ohio State University, Columbus, Ohio, June 1995, provides a schematic illustration of the microstructure that can form in the IRCG. This schematic is shown in FIG. 6A through FIG. 6G. FIG. 6A has ordinate 78 representing temperature in ° C. and abscissa 79 representing time in seconds. In this example, the base metal comprises about 0.10 wt % carbon and the beginning microstructure consists of ferrite 81 and pearlite 82. The first weld pass creates a coarse austenitic structure 85 at peak temperature and FIG. 6B shows that the coarse austenite is of the same carbon content 78 as it was at room temperature. FIG. 6B has ordinate 70 representing temperature in ° C. and abscissa 71 representing weight percent carbon. Liquid region 72, delta ferrite region 73, austenite region 74, ferrite plus austenite region 76, and ferrite plus cementite region 77, are also shown. Upon cooling most of the austenite 85 transforms to upper bainite 86. A small amount of proeutectoid ferrite 83 can also form from the austenite 85. During the second weld pass thermal cycle, once the temperature rises above the $A_1$ transformation temperature, small "islands" of austenite 87 form, primarily, at prior-austenite grain boundaries. Some islands of austenite 87 also form on lath boundaries. The austenite islands 87 are enriched in carbon well beyond that of the base metal; e.g., austenite islands 87 have about the carbon content at point 75 in FIG. 6B, which is higher than the about 0.10 wt % carbon of the base metal. If the cooling rate is fast enough, the austenite 87 may transform to martensite 88 or martensite-austenite constituent (M-A) 88 and the martensite can have a twinned substructure.

The distribution of M-A islands 88 in the IRCG is somewhat different than in the ICHAZ. In the IRCG, the M-A islands 88 typically outline the prior-austenite grain boundaries. This morphology has been referred to as a "necklace" structure. Referring again to FIG. 3F, in the ICHAZ, the islands 37 are mostly located within regions that were base metal pearlite before welding and a necklace structure is not produced. Toughness degradation due to M-A islands in the IRCG can be severe. It has been the subject of numerous studies. For example, see REF. numbers 8 through 11. The primary effect of these islands is to create preferential sites for cleavage fracture initiation. This can cause a significant shift (deterioration) in the DBTT to higher temperatures.

The example and schematic provided in FIG. 6A through FIG. 6G is of a specific base metal and IRCG microstructure, but other possibilities exist. For example, it is possible that martensite, instead of upper bainite, will dominate the interior of the prior-austenite grains. It is also possible that the austenite islands on the prior-austenite grain boundaries will transform, on cooling, to a microstructure that is less detrimental than M-A. Regardless of the specific IRCG microstructure, two aspects are nearly unavoidable; (1) enlarged prior-austenite grains and, (2) a necklace arrangement of small grains outlining the prior-austenite grains. While some IRCG improvements can be produced by altering the base metal chemistry or welding procedure, the large grain size and necklace structure are characteristic, and they cause toughness reduction in the IRCG relative to other HAZ regions and/or the base metal.

HAZ Toughness and Structural Integrity

With respect to the integrity of structural weldments, the primary mechanical properties of interest are strength and toughness. Strength provides general load carrying capability while toughness provides load carrying capability when defects are present. As is known to those skilled in the art of welding engineering and structural mechanics, weld defects are a fact of life, and these flaws can cause failure by brittle fracture at loads below the design criteria.

When loads are applied to a steel component that contains a sharp defect (like a crack), a stress concentration is created near the defect tip. The elevated stresses may only affect a region a few millimeters in diameter. Despite this region being small, if the local microstructure lacks sufficient toughness, then a cleavage fracture can initiate. In fact, it is possible for cleavage fracture, and subsequent structural failure, to initiate within a region that is just severalmicrons in cross sectional diameter.

The local nature of cleavage initiation provides a mechanism whereby small, low toughness HAZ regions (i.e., LBZs) can cause structural failure even if these regions are surrounded by tough material. The possibility of LBZs causing structural failure has been debated primarily within the engineering community that designs, produces steel for, and/or builds fixed offshore platforms. For example, see REF. numbers 1 through 4, 6, 7, and 10 through 12. After about twenty years of study, it is generally believed that the mechanism of cleavage initiation from LBZs is real. It is not a testing fluke associated with laboratory measurements. On the other hand, the absence of platform failures due to LBZs requires an explanation. It appears that while this failure mechanism is possible, there are enough safety factors in place (for offshore platforms) that the probability of failure is low. In other words, the probability is low that a very sharp defect will be located in or near an LBZ in an area of a structure that will experience the simultaneous occurrence of a large enough load and a cold enough temperature to cause failure.

For applications other than offshore platforms, determining the significance of LBZs requires attention paid to topics like material toughness, loading type (fatigue, static, impact, etc. . . . ), structural redundancy, in-service inspection, and fabrication methods. While some applications will be inherently resilient to LBZs, it is likely that others will prove sensitive to LBZs and new techniques will be necessary to provide suitable designs. Considering the trend of ongoing steel making improvements and the selection of these materials for harsh service, the development of welding methods that increase the toughness of LBZ regions, or eliminate them entirely, would be very useful.

U.S. Pat. No. 1,554,546

It has been known for some time that the multiple thermal cycles imposed on any one HAZ region in a multipass weld can be beneficial for certain mechanical properties. In fact, welding procedures have been specifically designed to take advantage of multipass heating for the improvement of properties like HAZ toughness, corrosion resistance, and hydrogen cracking resistance. See, for example, REF. numbers 13 and 14. Related to this type of procedure, J. B. Austin, in U.S. Pat. No. 1,554,546, describes a method where a weld bead, called a "refiner", is placed on top of another for the purpose of improving the properties. Austin describes that some welds contain undesirable factors such as "internal stresses" and coarse, brittle microstructures. He states that his refiner weld bead can reduce or eliminate these factors. Several of the drawings from Austin's patent are redrawn in FIG. 7 through FIG. 12A. FIG. 7 and FIG. 8 show schematic before and after cross sections of a weld 90 with the refiner bead 91 applied. FIG. 9 and FIGS. 10 and 12A (copy of FIG. 10) show fillet and butt weld geometries, respectively, that have refiner beads 91' and 91" applied. FIG. 11 shows a fillet weld with two refiners 93 and 94 applied.

In discussing improvements to welds, or as Austin refers to them "seams", Austin states, e.g., at page 2, lines 122–130, that by the application of his invention, one will have " . . . prevented the formation of or removed any embrittlement in the base metal or metals adjacent to the line of fusion of such seams." Austin states, e.g., at page 3, lines 126–130, that his refiner weld bead "apparently . . . reheats the seam weld and zones of the base metal . . . up to or somewhat above the $A_3$ temperature . . . " and he states, e.g., at page 4, lines 24–30, that the " . . . adjacent base metal is grain refined and further, any brittle constituents of the base metal adjacent to the weld are substantially eliminated."

J. B. Austin's patent is dated 1925, and at that time, relatively little was known about the details of metallurgical transformations in steel HAZs. In fact, the term "heat affected zone" was not yet in use. The definitions and detail shown in FIG. 1 through FIG. 6G, of this application, and the knowledge of how HAZs change with steel chemistry were unknown to Austin. It was fortuitous that J. B. Austin noticed some beneficial effects of his "refiner" weld, because by present day standards, it can be anticipated that certain regions within his welds were either not improved over the original weld or they may have been degraded. If Austin's butt weld, as shown in FIG. 10 (of this application), is redrawn to show various HAZ regions, then FIG. 12A and FIG. 12B (of this application), showing the base plate 98 and refiner weld 99, results. In FIG. 12A and FIG. 12B, the presence of unaltered CGHAZ 100, IRCG 102, and SRCG 104 regions are shown. As discussed above, these regions typically have low toughness. Certainly the unaltered HAZ of the refiner bead would have no better toughness than the original unaltered HAZ of the primary bead. It can be reasoned that while some areas in J. B. Austin's welds were improved due to multipass reheating, there still existed areas of low toughness, i.e., LBZs.

In 1925, LBZs could not have been detected because no test methods were known for measuring the appropriate property, fracture toughness. The lack of metallurgical understanding of the time prevented the development of suitable test methods. Also, the significance of sharp defects in steels was not known (see, e.g., REF. number 5) and the idea that the integrity of a weld joint could be compromised by small low toughness regions was a foreign concept. In 1925, tests of ductility or "brittleness" did not incorporate the use of sharp cracks and the evolution of fracture mechanics was still decades away.

Another reason that it would have been difficult in 1925 for anyone to understand the shortcomings of J. B. Austin's patent is related to the quality of steels and welds. The idea of degraded toughness presumes that a comparison toughness is available that is relatively high. Because of the general low quality of steel and welds in 1925, a technique like Austin's was considered an improvement. However, if the same technique is applied at the time this patent application is filed, it might be considered detrimental. In a fortuitous sense, Austin uncovered some phenomena about the benefits of multipass welding, but in reality his methods have modern day limits because his techniques fail to account for metallurgical factors like LBZs and the structural significance of such regions.

SUMMARY OF THE INVENTION

The current invention relates to welding methods that, when used to join pieces of steel, create extremely uniform, fine-grained HAZ microstructures. These methods substantially eliminate the CGHAZ without creating low toughness regions like the IRCG. The term "TEHAZ" (thermally enhanced heat affected zone) is used herein as an acronym for this welding technique. The primary benefit of a TEHAZ weld is excellent fracture toughness. The TEHAZ technique is intended for use on structural steels.

A TEHAZ weld is a butt weld made using a narrow groove geometry and a relatively straight sided bevel. There is little, if any bevel angle on the base material edges. The weld joint is filled by applying successive layers. Each layer consists of one primary weld bead and one or more autogenous beads. The primary bead is made using a consumable wire addition and each primary bead penetrates both sidewalls. All beads are, generally, symmetric about the weld centerline and they have the same general shape. This helps efficient superposition of HAZ isotherms.

The autogenous beads are for the purpose of imposing particular thermal cycles on the HAZ. Each autogenous bead has the same general shape as the previous primary bead except that it is smaller by a controlled amount than the previous bead. The similar geometry of all beads helps create a particular thermal cycling of the HAZ material that is specific to the TEHAZ technique.

The thickness of the primary beads is controlled to create sufficient reaustenization in the HAZ. The reaustenization cycles imposed by the TEHAZ method create an austenite grain size in the HAZ that is small and very uniform. Large rogue grains that are present in typical welds, even in very low heat input multipass welds, are substantially eliminated. The final HAZ microstructure in a TEHAZ weld is very fine.

A key factor concerning the TEHAZ thermal cycles is that the ICHAZ of each autogenous pass is placed in a relatively benign location. Each ICHAZ is placed on top of fine-grained material. This is accomplished by making the $A_1$ isotherm of each autogenous pass coincide with the $A_3$ isotherm of the previous pass. By this method, deleterious IRCG regions are avoided.

DESCRIPTION OF THE DRAWINGS

The advantages of the present invention will be better understood by referring to the following detailed description and the attached drawings in which:

FIG. 3A through FIG. 3F (all PRIOR ART) illustrate the phenomena whereby newly formed austenite transforms to a hard/brittle constituent on cooling in a hypothetical ferrite-pearlite steel of 0.10 wt % carbon;

FIG. 5A through FIG. 5C (all PRIOR ART) provide a schematic of the various regions in a multipass weld;

FIG. 6A through FIG. 6G (all PRIOR ART) provide a schematic illustration of the microstructure that can form in the IRCG during welding;

FIG. 7 (PRIOR ART) is a redrawing of FIG. 3 from U.S. Pat. No. 1,554,546;

FIG. 8 (PRIOR ART) is a redrawing of FIG. 4 from U.S. Pat. No. 1,554,546;

FIG. 9 (PRIOR ART) is a redrawing of FIG. 7 from U.S. Pat. No. 1,554,546;

FIG. 10 (PRIOR ART) is a redrawing of FIG. 8 from U.S. Pat. No. 1,554,546;

While the invention will be described in connection with its preferred embodiments, it will be understood that the invention is not limited thereto. On the contrary, the invention is intended to cover all alternatives, modifications, and equivalents which may be included within the spirit and scope of the present disclosure, as defined by the appended claims.

DETAILED DESCRIPTION OF THE INVENTION

A technique is provided to produce HAZs with excellent fracture toughness in steel welds. This technique is called TEHAZ or thermally enhanced heat affected zone and it is intended for use on structural steels. The TEHAZ technique involves controlling the geometry and position of the beads in a multipass weld so that a very uniform, fine-grain microstructure is produced. The TEHAZ technique also includes the use of autogenous passes to refine grain size and prevent the formation of low toughness IRCG regions. Three primary microstructural factors are controlled with TEHAZ welding: (1) the CGHAZ is substantially eliminated by reducing the prior-austenite grain size, (2) large, rogue grains in reaustenitized regions of the CGHAZ are substantially eliminated, and (3) IRCG regions are substantially avoided.

The TEHAZ technique uses three methods to produce a small, uniform grain size in the region that would normally be the CGHAZ. First, a narrow groove, butt weld geometry is employed so that the HAZ isotherms are efficiently superimposed. Second, suitably thin weld beads are deposited to reaustenitize the CGHAZs at progressively lower temperatures. Third, autogenous passes are used to create additional reaustenization potential and to prevent IRCG regions from forming.

The TEHAZ technique can be applied to varying degrees and one of the primary variables is weld bead thickness. Weld bead thickness can be controlled by changing such parameters as wire feed speed, travel speed, and heat input as is known to those skilled in the art of welding engineering. In general, thinner beads create better toughness. The degree to which the TEHAZ technique is applied depends on the desired toughness. Once the toughness goals have been established for a particular steel and structural application, trial welds can be made with varying degrees of TEHAZ applied in order to establish the required welding procedure.

The Bevel

The TEHAZ method depends on controlled thermal cycling of HAZ areas. The shape of the weld beads and their positioning relative one another is key. An element of control can be gained by selection of the weld bevel geometry. Although TEHAZ principles can be applied to a number of weld joint types, the TEHAZ technique is preferably applied using a butt-weld geometry.

Figure 13:
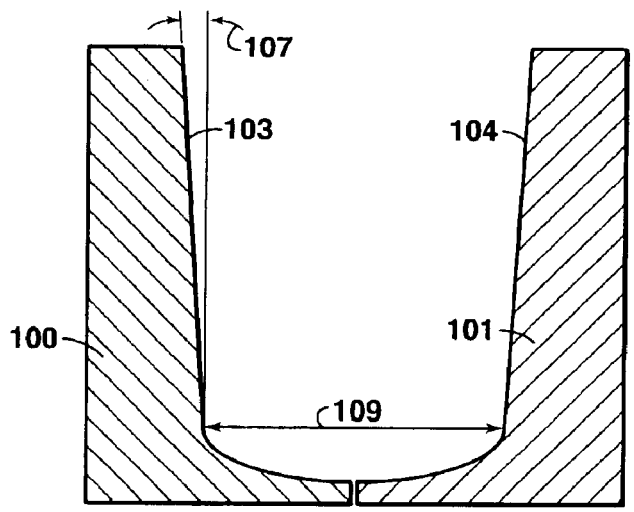
FIG. 13 illustrates a narrow groove weld bevel.
Figure 14:
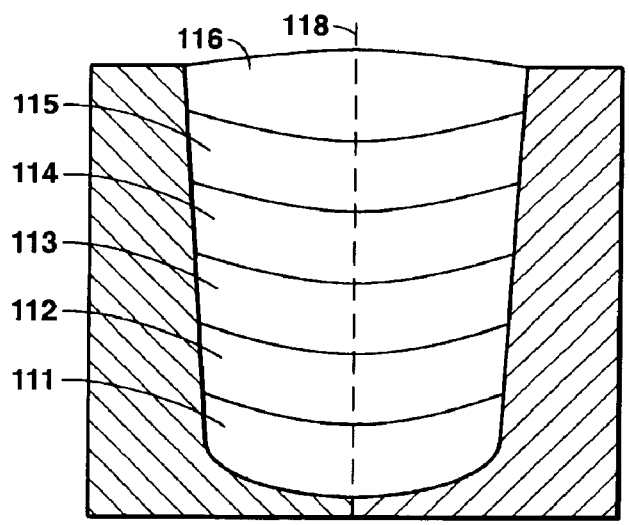
FIG. 14 is a schematic of a narrow groove bevel that has been filled by applying successive layers using the one bead per layer technique.

FIG. 13 shows an example of a suitable weld bevel between base metal pieces 100 and 101. Also identified in FIG. 13 are sidewalls 103 and 104 and small bevel angle 107. When butt welding two plates or metal pieces 100 and 101 using the TEHAZ method, it is preferable if the bevel angle on each of sidewalls 103 and 104 is relatively small, say, less than about 100. Bevel width 109 is preferably small enough such that each weld pass deposited with filler material penetrates both sidewalls 103 and 104. Also, bevel width 109 is preferably filled by a welding technique referred to herein as applying one bead per layer, in which the weld groove is filled by depositing successive layers whereby each layer is comprised of a primary bead and at least one autogenous bead. Weld beads that are deposited with filler material are referred to herein as primary beads and passes applied without filler added are referred to herein as autogenous beads. A TEHAZ butt weld is produced by depositing successive layers; and each layer consists of one primary bead and one or more autogenous beads. All beads are preferably applied with the welding torch positioned essentially in the center of the weld groove. Side-to-side electrode oscillation can be used, if desired, as long as the weaving is generally symmetric about the weld joint centerline (i.e., an imaginary line that is equal distance from each of the sidewalls of the weld groove), and the oscillation frequency is fast enough to prevent significant thermal variations along the length of the weld. FIG. 14 shows a schematic of a narrow groove bevel that has been produced by applying successive layers 111 through 116 using the one bead per layer technique. It is difficult, but not impossible, to employ TEHAZ thermal cycling if the one bead per layer technique is not used.

By using a narrow groove with minimal sidewall bevel, the weld joint acts like a mold that controls the shape of the beads and, thus, the position of the HAZ isotherms. Each weld bead, whether primary or autogenous, is essentially symmetric about the weld centerline. For example weld beads, or layers, 111 through 116, shown in FIG. 14 are substantially symmetric about weld centerline 118. Because of the symmetry, and because each bead is approximately the same width as the previous bead, the HAZ isotherms are efficiently superimposed on one another as will be described below. This provides very effective reaustenization of the CGHAZ that is an important factor of TEHAZ welding. It is difficult to overlap HAZ isotherms according to the principles of the TEHAZ invention in a weld bevel other than a narrow groove bevel of the type shown in FIG. 13. This is particularly the case in a fabrication setting where many welds are to be produced and day-to-day welding variations can generate unintended changes in HAZ position and/or geometry. Such variations can be suitably minimized in a fabrication setting by using the groove geometry shown in FIG. 13 to help control bead shape and thus HAZ position and/or geometry.

Bead Thickness and Reaustenization

Figure 15:
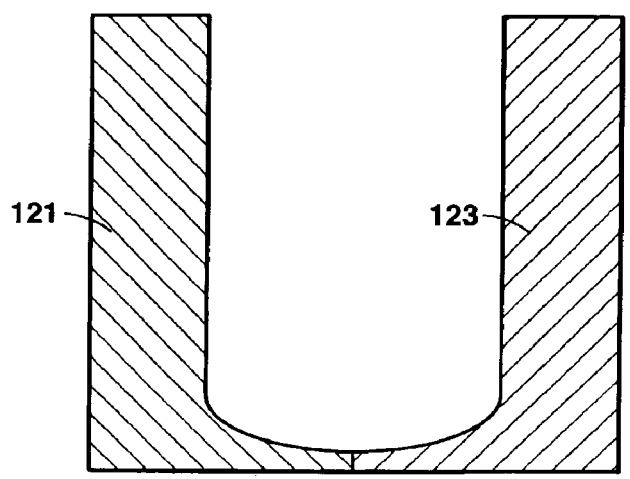
FIG. 15 illustrates two base metal pieces positioned to form a straight-sided, narrow groove, which is preferred for producing a TEHAZ weld joint according to this invention.

FIG. 15 shows two base metal pieces 121 and 123 that have been prepared according to a preferred TEHAZ weld groove; a straight-sided, narrow groove geometry. This geometry is preferred for TEHAZ welding according to this invention, but it should not be considered limiting. Other geometries, such as two sided welds, can be TEHAZ welded as long as the groove shape is narrow enough to apply one bead per layer. The sidewall bevels are preferably less than about 10°. In a series of schematics, the weld groove of FIG. 15 will be hypothetically welded. Step-by-step, welds with beads of decreasing thickness will be compared. These comparisons are important for the teaching of principles of bead thinning and thermal control of the HAZ. The purpose of decreasing bead thickness is to produce a microstructure near the weld fusion line that has a small prior-austenite grain size, and is essentially free of rogue grains.

Figure 16A:
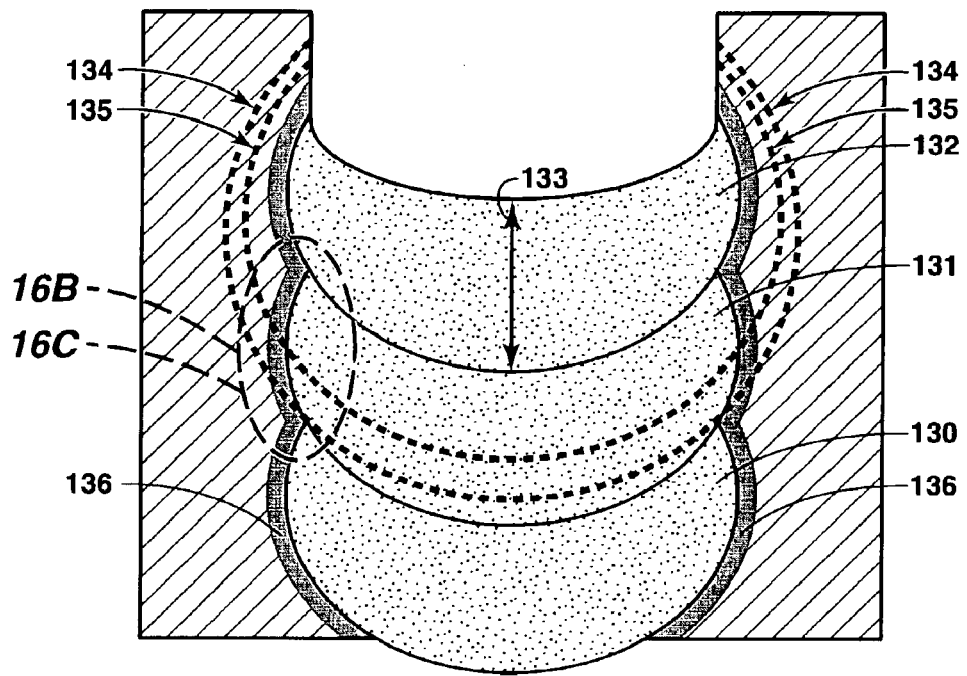
FIG. 16A illustrates a weld joint produced by applying three weld passes to the straight-sided, narrow groove of FIG. 15.
Figure 16B:
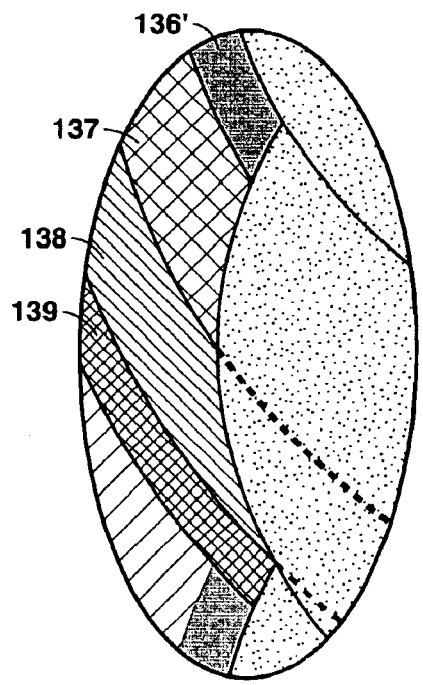
FIG. 16B illustrates an enlarged weld fusion line area of the weld joint of FIG. 16A.

FIG. 16A shows a weld joint produced using the weld groove of FIG. 15 and with three weld passes applied to form a weld joint, e.g., first pass 130, second pass 131, and third pass 132, each with a relatively large bead (layer) thickness 133. The positions of $A_1$ isotherm 134 and $A_3$ isotherm 135 created by the third pass 132 are shown. Also shown in FIG. 16A is the position of CGHAZ 136 that was originally created upon application of each pass. FIG. 16B shows an enlarged weld fusion line area and several HAZ regions created by third pass 132 are identified: CGHAZ 136', FGHAZ 137, ICHAZ 138, and SCHAZ 139. From the standpoint of reducing prior-austenite grain size and improving toughness, FGHAZ 137 is a significant improvement over the original CGHAZ 136 of second pass 131. CGHAZ 136', however, offers no improvement because it is the unaltered CGHAZ 136 of third pass 132.

Figure 16C:
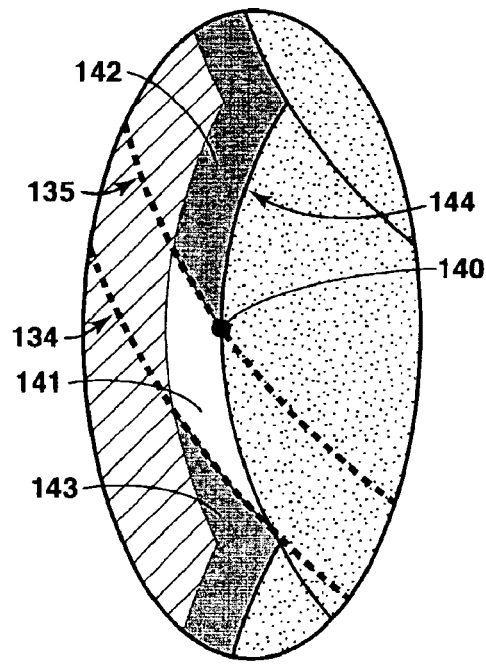
FIG. 16C illustrates an enlarged weld fusion line area of the weld joint of FIG. 16A and how HAZ isotherms of the third weld pass intersect the CGHAZ of the second weld pass.

FIG. 16C illustrates an enlarged weld fusion line area from the weld joint of FIG. 16A and how HAZ isotherms 134 and 135 of third pass 132 intersect the original CGHAZ 136 of second pass 131. FIG. 16C shows intersection point 140 of $A_3$ isotherm 135 and weld fusion line 144 of second pass 131. Because intersection point 140 lies well within the bulk of second pass 131 (as opposed to intersecting first pass 130), the microstructure in original CGHAZ area 142 of second pass 131 is reaustenitized once by third pass 132. FIG. 16C also illustrates that the intersection locations between $A_1$ isotherm 134 and $A_3$ isotherm 135 created by third pass 132 and weld fusion line 144 of second pass 131 are such that IRCG region 141 and SRCG region 143 are created. The schematics of FIGS. 16A, 16B, and 16C, demonstrate that the illustrated weld contains IRCG, SRCG, and unaltered CGHAZ regions. As is known to those skilled in the art, and as was discussed in the Background section, these regions are detrimental to toughness.

Figure 1:
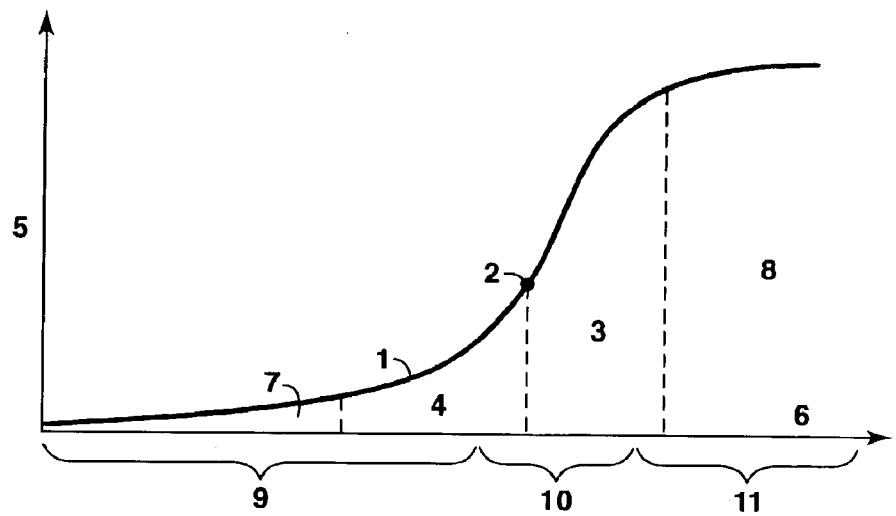
FIG. 1 (PRIOR ART) illustrates a representative ductile-to-brittle transition curve for steel.
Figure 2:
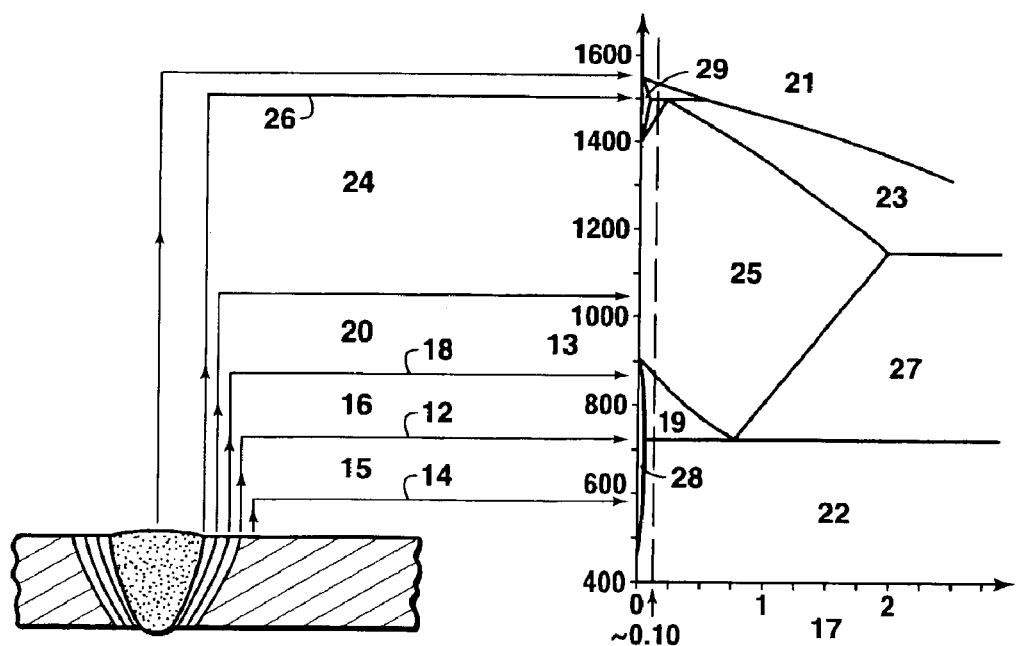
FIG. 2 (PRIOR ART) is a phase diagram illustrating the four regions of a single pass HAZ for a steel with 0.10 wt % carbon content.
Figure 4A:
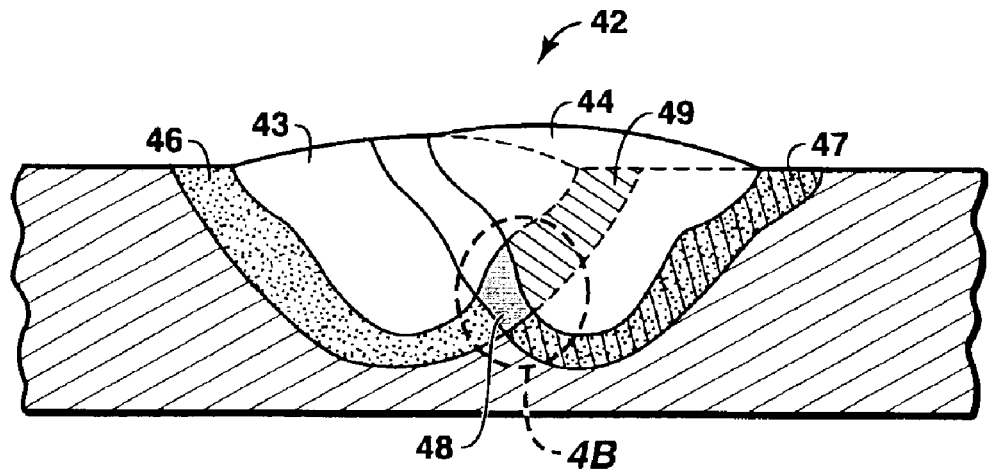
FIG. 4A through FIG. 4B (all PRIOR ART) provide a schematic of the various regions in a two pass weld.
Figure 4B:
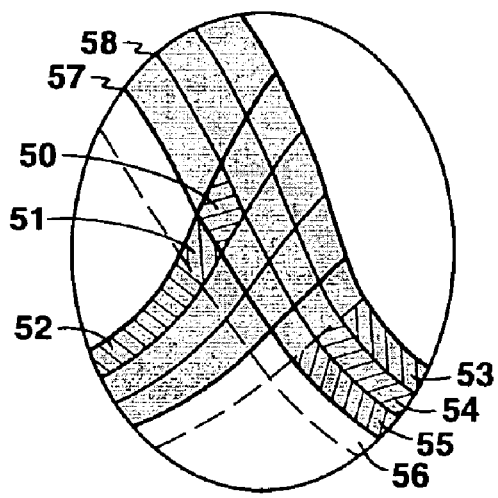
Figure 11:
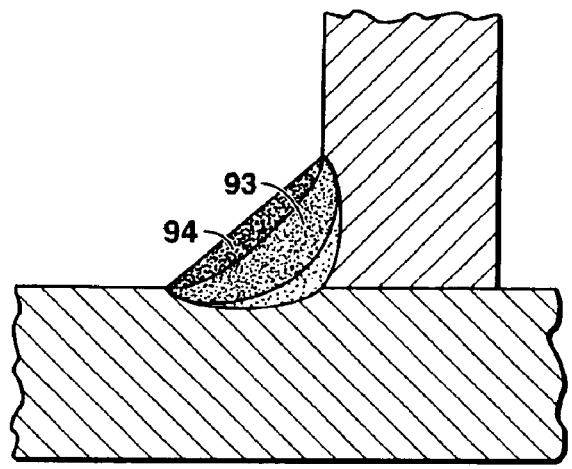
FIG. 11 (PRIOR ART) is a redrawing of FIG. 9 from U.S. Pat. No. 1,554,546.
Figure 12A:
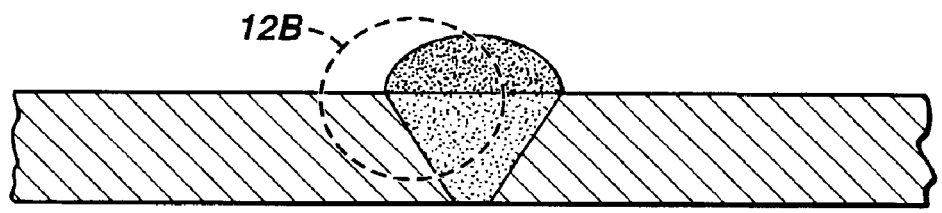
FIG. 12A (PRIOR ART) is a redrawing of FIG. 8 from U.S. Pat. No. 1,554,546.
Figure 12B:
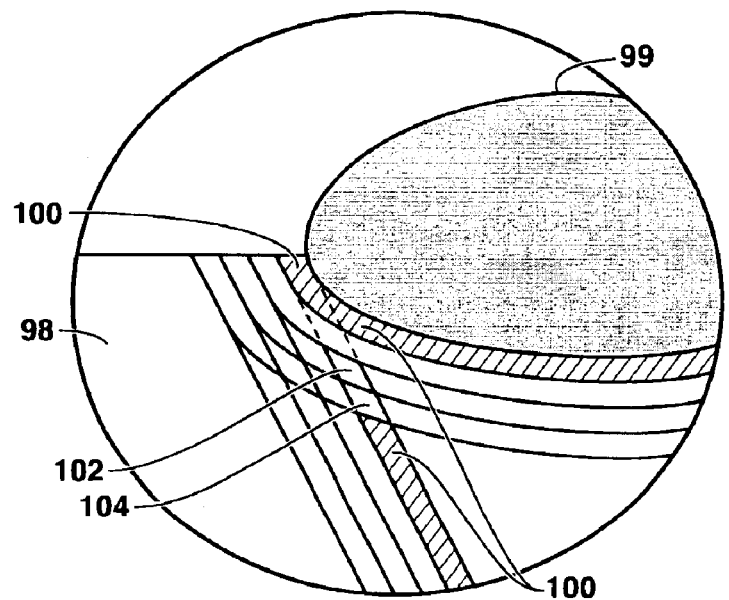
FIG. 12B illustrates in more detail than in FIG. 12A, various HAZ regions from the weld of FIG. 12A.
Figure 17A:
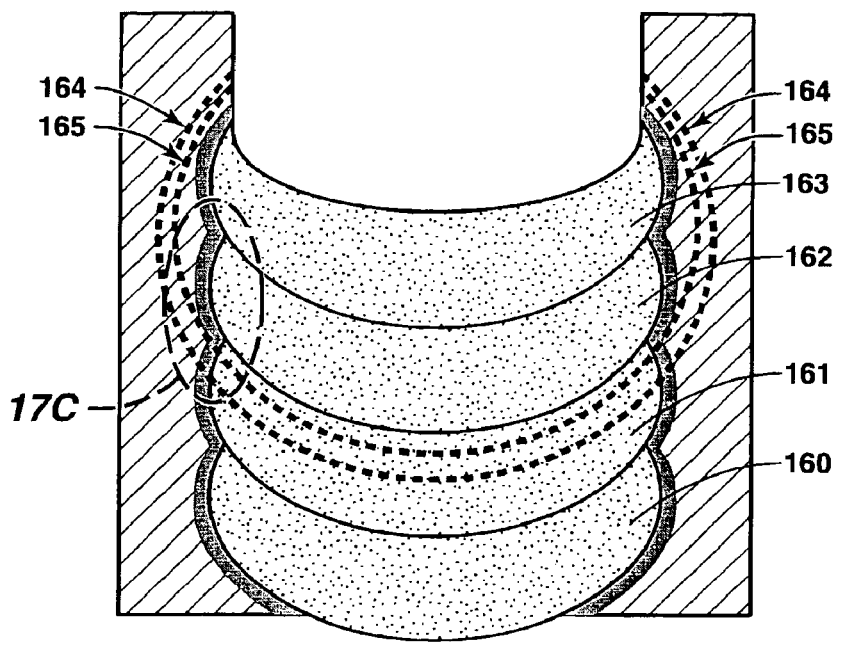
FIG. 17A illustrates a weld joint produced by applying four weld passes to the straight-sided, narrow groove of FIG. 15.
Figure 17B:
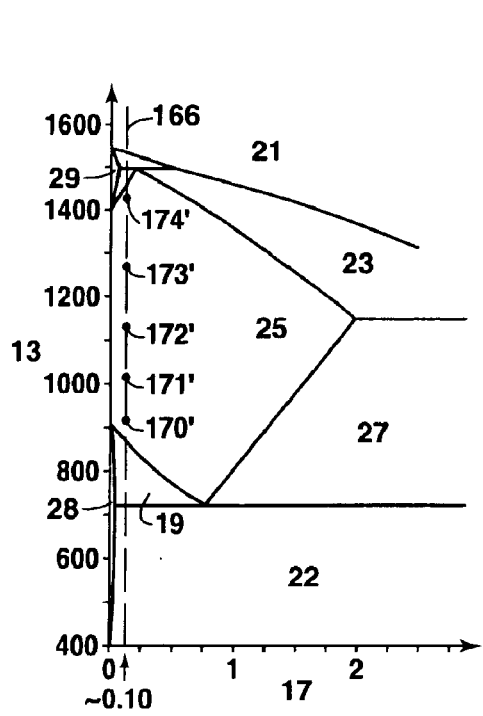
FIG. 17B is a redrawing of the phase diagram shown in FIG. 2 and shows reheat temperatures for the weld of FIG. 17A.
Figure 17C:
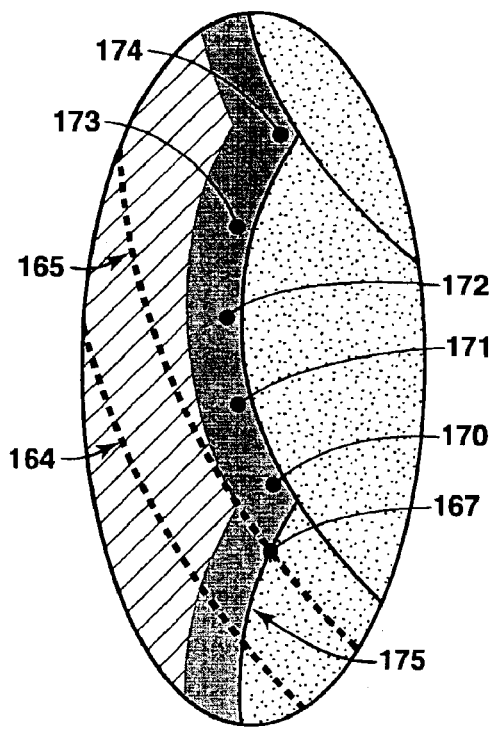
FIG. 17C illustrates an enlarged weld fusion line area of the weld joint of FIG. 17A.

FIG. 17A depicts a weld joint produced using the weld groove of FIG. 15 and with beads 160, 161, 162, and 163 that are thinner than the beads shown in FIG. 16. The $A_1$ isotherm 164 and $A_3$ isotherm 165 of fourth pass 163 are marked. The phase diagram of FIG. 2 is shown in FIG. 17B to help describe the enlarged area of the weld fusion line shown in FIG. 17C. Vertical line 166 identifies the steel being welded as containing about 0.10 wt. % carbon. This carbon content is only one example. The principles shown in this and subsequent figures apply to steels containing from about 0.02 wt. % carbon up to about 0.45 wt. % carbon. Intersection point 167 between $A_3$ isotherm 165 of fourth pass 163 and weld fusion line 175 of second pass 161 is shown. Comparing the location of intersection point 140 in FIG. 16B and intersection point 167 in FIG. 17C, it can be seen that making thinner beads causes this point to penetrate deeper into the weld. Therefore, thinner beads cause the HAZ isotherms of each pass to affect more material of the previous passes. FIG. 17C illustrates that the original CGHAZ created by third pass 162 has been completely reaustenitized by fourth pass 163. This fact is highlighted in FIG. 17C by showing several points 170 through 174 in the original CGHAZ of third pass 162 and then plotting the associated peak temperatures reached during reaustenization on the phase diagram of FIG. 17B (see points 170', 171', 172', 173', and 174'). As controlled by the bead thickness of this weld, the original CGHAZ of third pass 162 has been reaustenitized over a range of temperatures from near the low temperature boundary of the FGHAZ (the $A_3$) up to the high temperature boundary of the CGHAZ, as will be familiar to those skilled in the art of welding engineering.

Although not specifically depicted in FIGS. 17A–17C, it should be noted that if the weld of FIG. 17A was completed using beads of substantially the thickness shown, then the reaustenization patterns of all passes can be, essentially, understood by referring to the phenomena shown for the few passes illustrated in FIG. 17C. Each original CGHAZ in the weld illustrated in FIGS. 17A–17C is completely reaustenitized once during the welding sequence. As FIG. 17B demonstrates, the reaustenitized CGHAZs in this weld contain material with improved toughness (i.e., the fine grained material created by reheat temperatures 170' through 172') as well as material with no improvement in toughness (i.e., the coarse grain material created by reheat temperatures 173' and 174'). In general, reaustenization creates toughness improvement, but several details about the weld shown in FIGS. 17A–17C indicate there is ample opportunity for further improvement. The most obvious factor is that there are still CGHAZs left in this weld. A not so obvious factor involves the material located at points 170 through 172 in FIG. 17C (and analogous points associated with other beads), that is nominally fine grained. While these areas represent an improvement over the CGHAZ, they have only been reaustenitized once and this amount of reheating is insufficient to reduce the size of all the prior-austenite grains. Due to local material variations (discussed below), some grains in the original CGHAZ of a steel weld will retain their original size after only one reaustenization cycle. These grains are termed "rogue grains" (see Glossary of Terms). Rogue grains are detrimental to toughness because they produce large slip distances. Large slip distances increase the length and intensity of dislocation pileups which leads to lower cleavage resistance (see REF. number 5). It is an object of the TEHAZ invention to eliminate rogue grains.

Figure 18A:
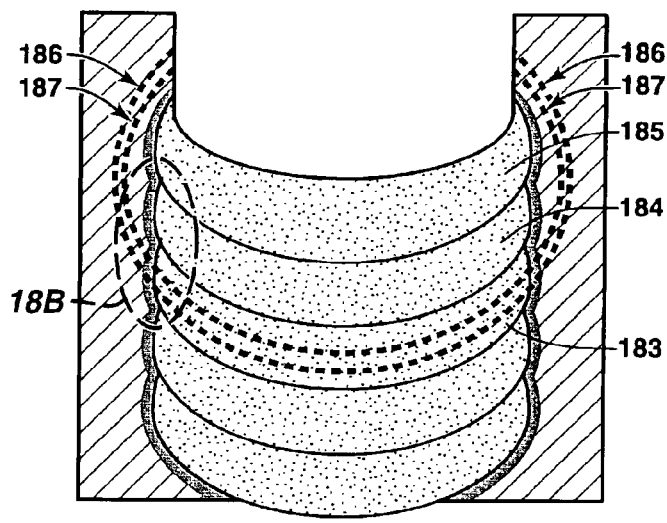
FIG. 18A illustrates a weld joint produced by applying five weld passes to the straight-sided, narrow groove of FIG. 15.
Figure 18B:
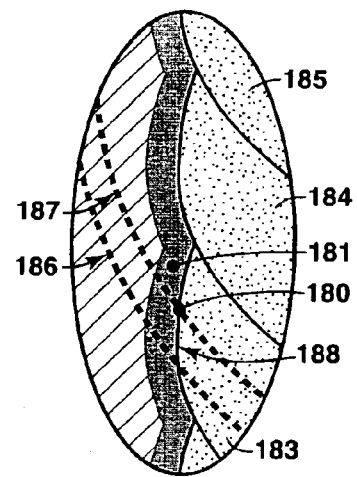
FIG. 18B illustrates an enlarged weld fusion line area of the weld joint of FIG. 18A and how the $A_1$ and $A_3$ isotherms of the fifth pass are positioned relative to the fourth pass and the third pass.

FIG. 18A shows a weld with beads that are thinner than the beads of the weld shown in FIG. 17A. FIG. 18B shows how $A_1$ isotherm 186 and $A_3$ isotherm 187 of fifth pass 185 are positioned relative to fourth pass 184 and third pass 183. The intersection point 180 between $A_3$ isotherm 187 and weld fusion line 188 of third pass 183 is deeper into the weld as compared to analogous intersection point 167 in FIG. 17C. This geometry means that a portion 181 of the original CGHAZ of third pass 183 has been reaustenitized twice in the welding sequence. It was first reaustenitized by fourth pass 184 to temperatures relatively high in the austenite range. The second reaustenization cycle was due to fifth pass 185 where the austenitizing temperature was low in the austenite range. The prior-austenite grains of region 181 will be relatively fine and beneficial for toughness. The second reaustenization cycle not only refines the grains, but it helps eliminate rogue grains.

Figure 19A:
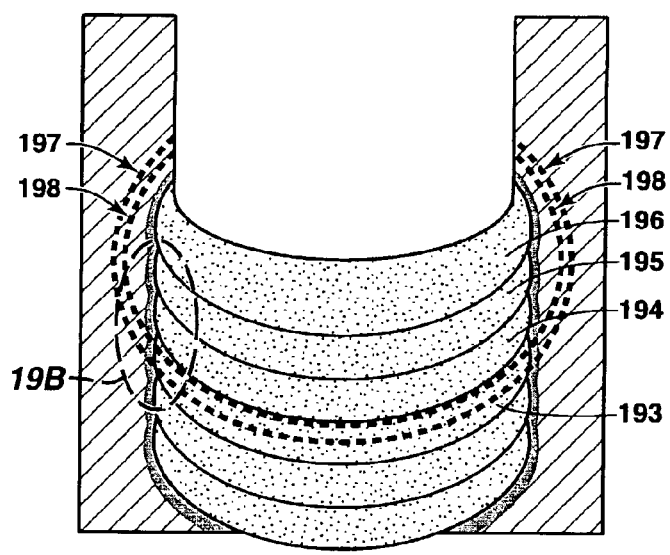
FIG. 19A illustrates a weld joint produced by applying six primary weld passes to the straight-sided, narrow groove of FIG. 15.
Figure 19B:
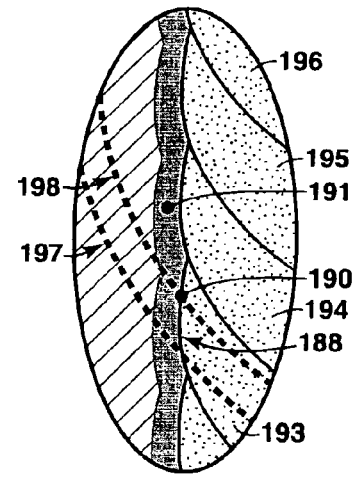
FIG. 19B illustrates an enlarged weld fusion line area of the weld joint of FIG. 19A and how the $A_1$ and $A_3$ isotherms of the sixth pass are positioned relative to the fifth pass, fourth pass, and third pass.

FIG. 19A shows a weld with beads that are thinner than the beads of the weld shown in FIG. 18A. FIG. 19B shows how $A_1$ isotherm 197 and $A_3$ isotherm 198 of sixth pass 196 are positioned relative to fifth pass 195, fourth pass 194, and third pass 193. The intersection point 190 between $A_3$ isotherm 198 and weld fusion line 199 of third pass 193 is deeper into the weld as compared to analogous intersection points 167 in FIG. 17C and 180 in FIG. 18B. This geometry means that essentially all of the original CGHAZ of fourth pass 194 (see region 191 in FIG. 19B), has been completely reaustenitized twice in the welding sequence; first by fifth pass 195 and second by sixth pass 196. It can be reasoned that in a finished weld of the type shown in FIG. 19A, essentially all of the original CGHAZ material will be reaustenitized twice. This offers significant toughness improvement over a weld with thicker beads (particularly over a weld that is not made using a narrow groove, single bead per layer geometry).

Figure 20A:
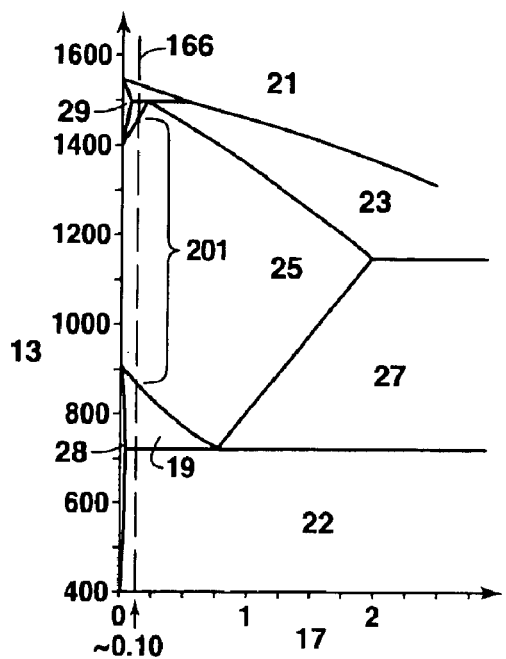
FIG. 20A is a redrawing of the phase diagram shown in FIG. 2 and shows the range of reaustenization temperatures experienced by a CGHAZ during a first reaustenization cycle.
Figure 20B:
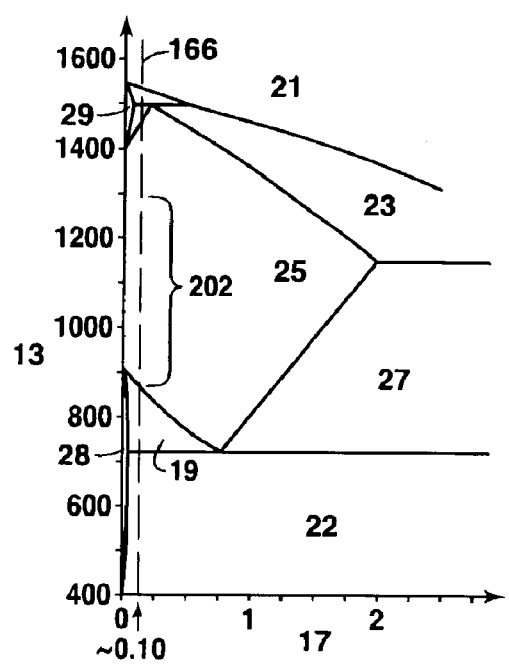
FIG. 20B is a redrawing of the phase diagram shown in FIG. 2 and shows the range of reaustenization temperatures experienced by a CGHAZ during a second reaustenization cycle.
Figure 20C:
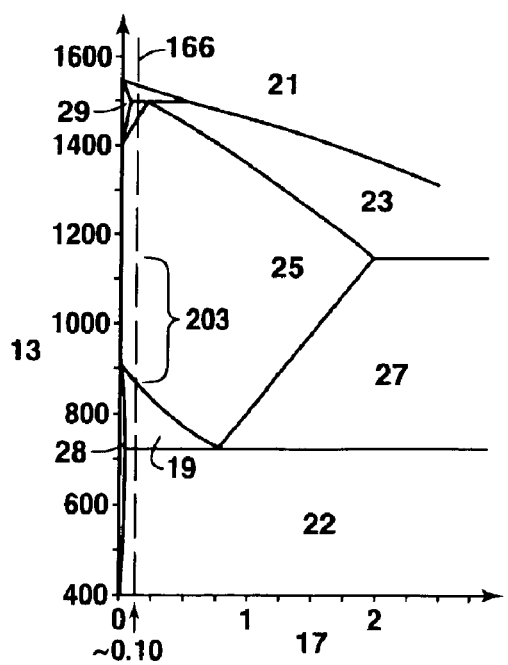
FIG. 20C is a redrawing of the phase diagram shown in FIG. 2 and shows the range of reaustenization temperatures experienced by a CGHAZ during a third reaustenization cycle.

FIG. 16A through FIG. 19B demonstrate that when using the preferred TEHAZ joint geometry (see, e.g., FIG. 15) and the one pass per layer approach, as the beads are made thinner, the original CGHAZ of each pass becomes reaustenitized to greater degrees. Additionally, as the number of reaustenization cycles increases, the peak temperature of reaustenization decreases and this refines the prior-austenite grain size. In other words, the peak temperature of the first complete reaustenization is as high as the upper temperature boundary of the original CGHAZ, but the peak temperature of the second complete reaustenization cycle will be significantly lower, and the peak temperature of the third cycle will be lower still. Suppose a weld is made in the groove shown in FIG. 13 and the beads are thin to the extent that each bead's original CGHAZ experiences three complete reaustenization cycles. The phase diagram of FIG. 2 is shown in FIGS. 20A through 20C to illustrate the range of reaustenization temperatures experienced by the CGHAZs as they are reheated by each of the three cycles. For the first reaustenization, FIG. 20A shows that each CGHAZ will experience a range of reheat temperatures 201 from the $A_3$ to the highest temperature possible in the austenite region. This is the same as for the case shown in FIG. 17C. Some regions of the CGHAZ will be grain refined, while the high temperature regions will be similar to the original CGHAZ. FIG. 20B shows the temperature range 202 experienced during the second reaustenization cycle. The highest temperature achieved is lower than for the first cycle. Likewise, FIG. 20C shows reaustenitizing temperatures 203 that occur during the third cycle. As original CGHAZ material is reaustenitized at decreasing temperatures, the prior-austenite grain size is reduced (and rogue grains are substantially eliminated as explained below). Applying primary beads (passes with filler added) that are suitably thin is one of the main techniques within the TEHAZ invention used to reduce the prior-austenite grain size of the CGHAZ.

The Limitations of Primary Passes

For applications that require high fracture toughness at low temperatures, three primary problems exist with narrow groove butt welds that include only primary passes (beads applied using filler wire). First, at some point, making thinner primary beads becomes impractical because the weld joint cannot be filled with reasonable efficiency. Second, it becomes difficult, if not impossible, to impose many reaustenization cycles on the CGHAZ because the heat source progresses (rises) up the groove with the deposition of each pass. The fact that metal is being deposited forces the torch to move away from the HAZ material that needs to be reaustenitized. Third, even with relatively thin primary beads, regions will exist where ICHAZ thermal cycles superimpose prior-austenite grains that are not as small as desired. This means that IRCG-like microstructures will be created and, as explained in the Background section, such microstructures are known to degrade toughness.

Figure 21B:
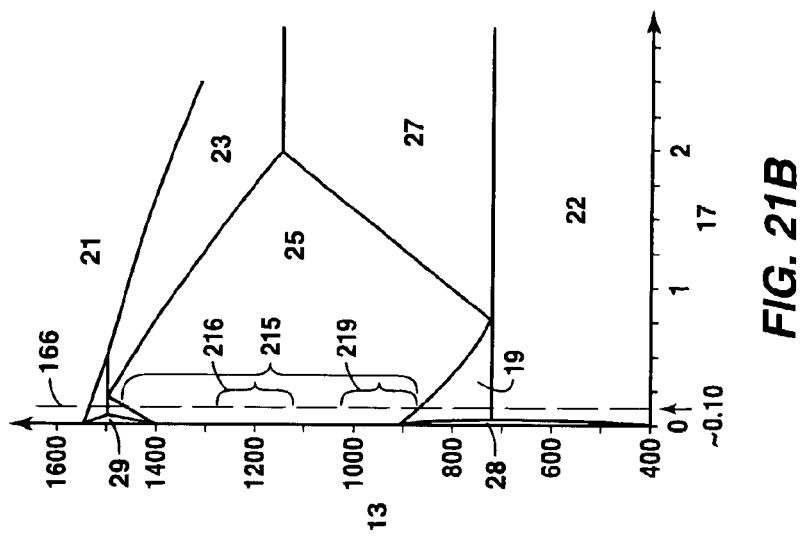
FIG. 21B is a redrawing of the phase diagram shown in FIG. 2 and shows peak temperatures experienced during welding to produce the weld joint illustrated in FIG. 21A.
Figure 21A:
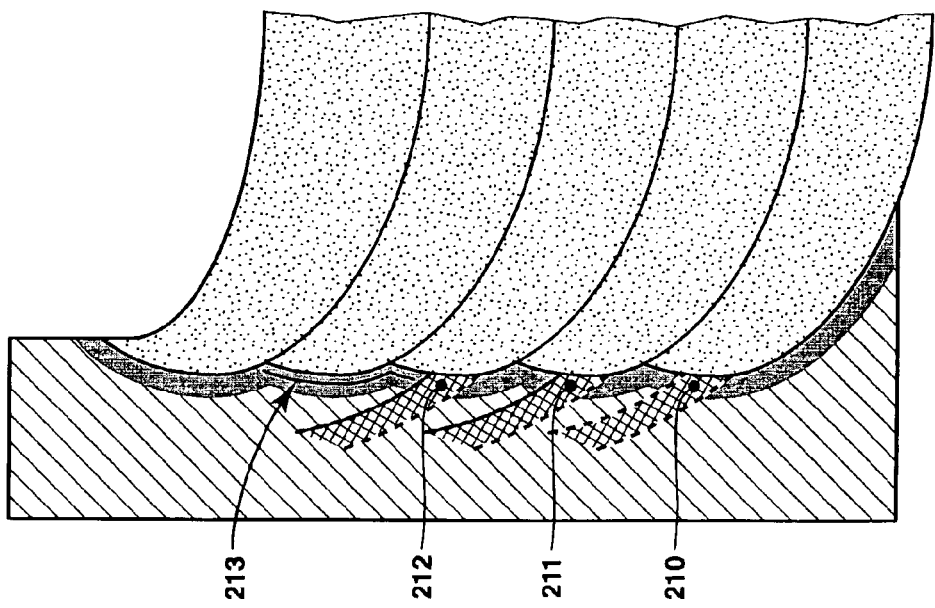
FIG. 21A is a redrawing of FIG. 18A except that several ICHAZ regions are highlighted.

The problem of creating IRCG-like microstructures when only primary passes are deposited is illustrated in FIG. 21A. This schematic is similar to that shown in FIG. 18A except that a portion of several ICHAZ isotherms is shown (in FIG. 18A only the fifth pass ICHAZ is shown). In FIG. 21A, third pass ICHAZ 210, fourth pass ICHAZ 211, and fifth pass ICHAZ 212 are marked at the location where each ICHAZ superimposes previous CGHAZ material. In the weld shown in FIG. 18, a portion 181 of the original CGHAZ is reaustenitized twice; however in the weld shown in FIG. 21A, the ICHAZs 210, 211, and 212 intersect the CGHAZ material at a location that has been reaustenitized only once. The metallurgical nature of these regions can be further defined by studying the CGHAZ material 213 that is reaustenitized by the fifth pass. In a manner analogous to FIG. 17A, the CGHAZ material 213 in FIG. 21A can be related to the peak temperatures experienced during welding. The range 215 in FIG. 21B shows these temperatures. FIGS. 21A and 21B show that the ICHAZs will superimpose CGHAZ material that has been reaustenitized at peak temperatures 216 significantly high in the austenite field. Therefore, the regions at the tips of the markers 210, 211, and 212, will contain IRCG-like microstructures and they will have degraded toughnesses. The term "IRCG-like" is used because these microstructures do not have the coarsest possible prior-austenite structure. FIG. 16C shows an example of a classic IRCG region 141, and this region was originally defined in relation to FIGS. 5 and 6. Because the weld of FIG. 21A will contain some relatively coarse prior-austenite grains and some IRCG-like regions, there is opportunity to improve the HAZ toughness of such a weld. Specifically, improvements can be made by further reduction of the CGHAZ prior-austenite grain size and by eliminating IRCG-like regions. As will be explained below, one of the primary ways that a TEHAZ weld accomplishes these improvements is by the application of autogenous passes.

TEHAZ Autogenous Passes

There are several key steps in making a TEHAZ weld. The appropriate weld geometry must be selected (see FIG. 13), the primary weld beads must be made in a single pass per layer geometry, and the primary beads must be suitably thin. Another key element of TEHAZ welding involves applying autogenous beads. A TEHAZ butt weld consists of layers of weld metal applied to a narrow groove geometry whereby each layer is comprised of a primary pass (a weld bead deposited using filler wire addition) and one or more autogenous passes. The purpose of the autogenous passes is to (1) further reduce HAZ prior-austenite grain size through reaustenization in the same manner as described for the primary passes, and (2) to prevent the formation of IRCG regions (or IRCG-like regions).

The primary beads of a TEHAZ weld can be deposited by a number of welding techniques. A partial (and non-limiting) list of welding processes that may be used includes shielded metal arc welding (SMAW), gas metal arc welding (GMAW), gas tungsten arc welding (GTAW), submerged arc welding (SAW), plasma arc welding (PAW), electron beam (EB) welding, and laser welding (LW). The important principles of TEHAZ welding relate to the positioning of HAZ thermal cycles and the process that creates these cycles is of secondary importance. Although many processes can be manipulated to create a TEHAZ weld, some techniques are easier than others to apply for typical structural steel applications. For example, because of the desire to make thin beads and to weld into a narrow groove, techniques like GTAW and GMAW are typically best suited for applying the primary beads. The autogenous passes are more limiting from the standpoint of weld process selection, because no filler metal is deposited. GTAW and PAW are typical choices for the autogenous passes. The autogenous passes of a TEHAZ weld produce isotherms that spread over nearly the same amount of material as did the isotherms of the previous pass.

Suppose a steel, a welding consumable, and a welding process have been chosen for a particular TEHAZ butt-welding application. Using different welding parameters, various levels of HAZ toughness can be created depending on bead thickness and the number of autogenous passes that are applied to each primary bead. Therefore, depending on the application and the specific toughness requirements, trial TEHAZ welds will have to be made and tested to determine the necessary choices of bead thickness and the number of autogenous passes to apply. The following descriptions provide the principles for sizing the autogenous passes relative to previous passes.

Each autogenous pass must have the same basic shape as the primary pass to which it is applied or the same basic shape as the autogenous pass to which it is applied. Each autogenous pass must be sized such that its ICHAZ superimposes the lower temperature portion of the FGHAZ of the previous pass. This ensures that the ICHAZ of the autogenous pass falls on HAZ material with a small prior-austenite grain size and, thus, IRCG-like microstructures are prevented.

Figure 22A:
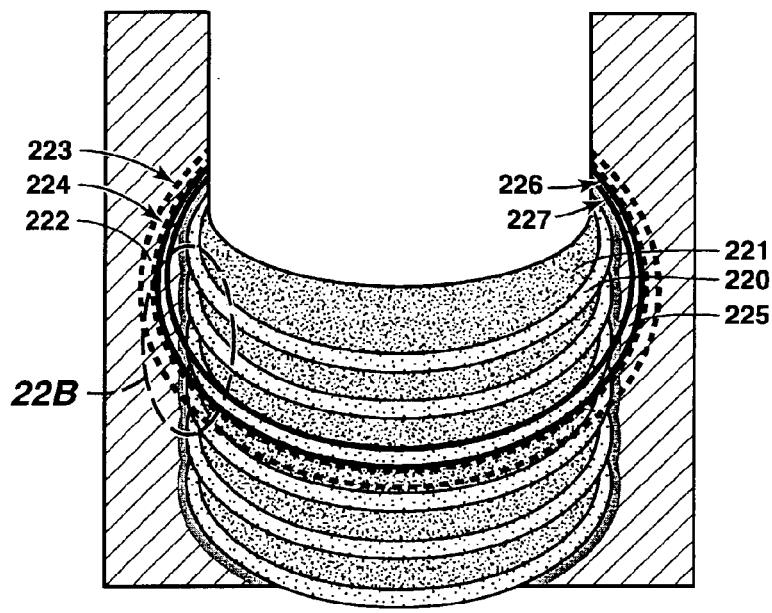
FIG. 22A illustrates the weld joint of FIG. 19A with an autogenous pass applied to each primary pass.
Figure 22B:
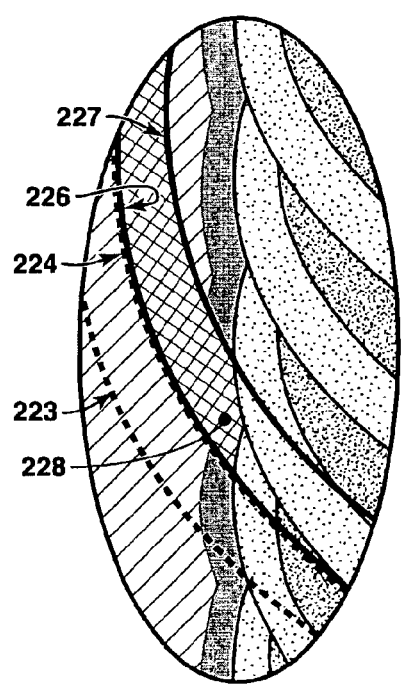
FIG. 22B illustrates an enlarged weld fusion line area of the weld joint of FIG. 22A.
Figure 22C:
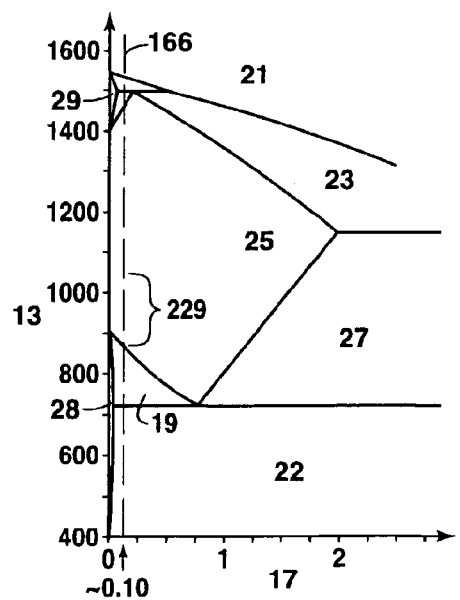
FIG. 22C is a redrawing of the phase diagram shown in FIG. 2 and shows reaustenization cycle temperature ranges experienced during welding to produce the weld joint illustrated in FIG. 22A.

If a single autogenous pass is applied to each primary pass of the weld shown in FIG. 19A, then the weld of FIG. 22A results. FIG. 22A shows ICHAZ 222 of sixth primary pass 220. ICHAZ 222 is bounded by $A_1$ isotherm 223 and $A_3$ isotherm 224. FIG. 22A also shows ICHAZ 225 of sixth autogenous pass 221. ICHAZ 225 is bounded by $A_1$ isotherm 226 and $A_3$ isotherm 227. The size of the autogenous passes is controlled such that their ICHAZs are superimposed on top of the FGHAZ of the previous pass. This aspect is particularly important near the weld fusion line because it prevents the creation of IRCG-like microstructures. For example, in the weld shown in FIG. 22B, at the location 228 where sixth autogenous pass ICHAZ 222 intersects the weld fusion line, the underlying HAZ material is the FGHAZ of sixth primary pass 220. Prior to the application of sixth autogenous pass 221, the underlying material at location 228 had experienced two reaustenization cycles. The second of these two cycles produced reaustenization temperatures 229 low in the austenite field (see FIG. 22C). It is a primary objective of the TEHAZ invention that the ICHAZ of the autogenous passes is positioned to superimpose on HAZ material whose last reaustenization cycle experienced temperatures low in the austenite field as shown by region 229 of FIG. 22C. Another way of stating the geometry and positioning requirements for the autogenous passes is that the $A_1$ isotherm of each autogenous pass should substantially coincide with the $A_3$ isotherm of the previous pass.

Figure 23A:
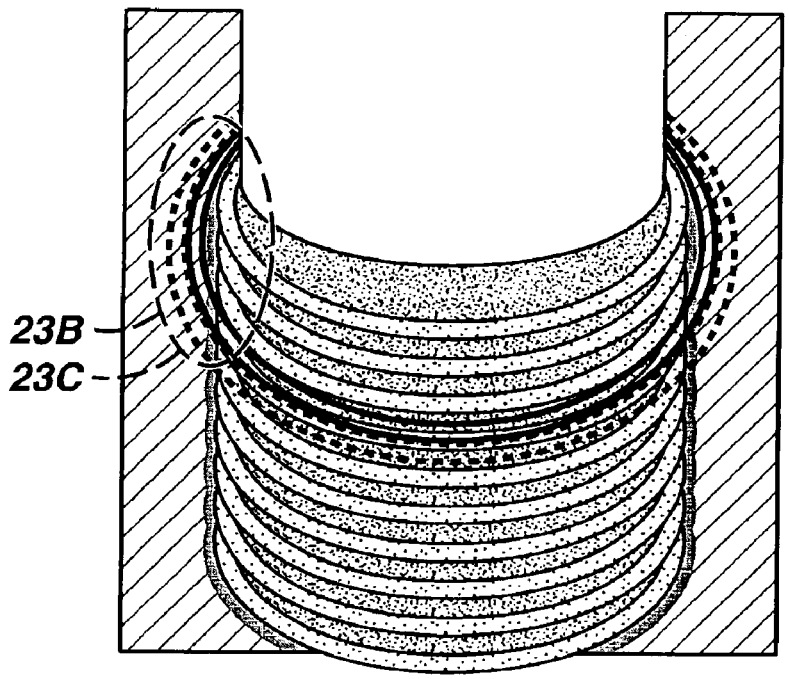
FIG. 23A illustrates a TEHAZ weld joint produced according to this invention and using the straight-sided, narrow groove of FIG. 15.
Figure 23B:
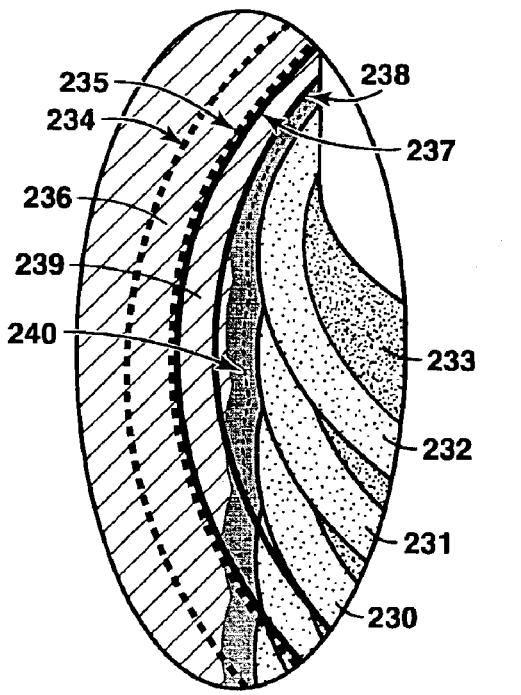
FIG. 23B illustrates an enlarged weld fusion line area of the weld joint of FIG. 23A.
Figure 23C:
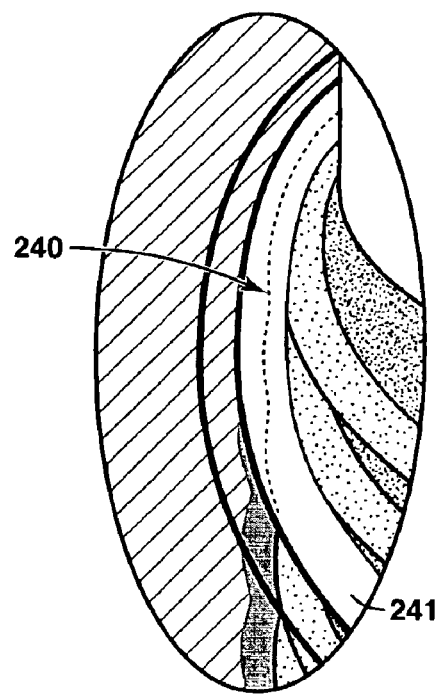
FIG. 23C illustrates an enlarged weld fusion line area of the weld joint of FIG. 23A.

For very demanding applications where many reaustenization cycles are required to refine the original CGHAZ, a particular benefit can be obtained with suitably thin beads and suitably sized autogenous passes. FIG. 23A shows a TEHAZ weld produced using the preferred weld groove of FIG. 15 and FIG. 23B shows an enlarged area of the TEHAZ weld of FIG. 23A highlighting key HAZ regions. Identified in FIG. 23B are eighth primary pass 230; ninth primary pass 231; tenth primary pass 232; tenth autogenous pass 233; $A_1$ isotherm 234 and $A_3$ isotherm 235 of tenth primary pass 232; ICHAZ 236 of tenth primary pass 232; $A_1$ isotherm 237 and $A_3$ isotherm 238 of tenth autogenous pass 233; and ICHAZ 239 of tenth autogenous pass 233. As shown for the tenth layer in FIG. 23B, which includes tenth primary pass 232 and tenth autogenous pass 233, and consistent with TEHAZ weld design, ICHAZ 239 of tenth autogenous pass 233 superimposes FGHAZ 241 (see FIG. 23C) of tenth primary pass 232. It is intended that all the layers in this weld possess this characteristic, each said layer including a primary pass and an autogenous pass. Because of the bead thickness and the relative positions of the various HAZ regions, the FGHAZ of the autogenous passes of the TEHAZ weld have a particularly beneficial geometry. In FIG. 23B, the area just inside the ICHAZ 239 of the tenth autogenous pass (i.e., the lower temperature portion of the FGHAZ of this autogenous pass) superimposes a significant amount of original CGHAZ material. The term "inside" is used to indicate proximity with respect to the original welding heat source. Inside an isotherm means closer the welding heat source. The line 240 marks the portion of CGHAZ material that becomes superimposed by the FGHAZ of tenth autogenous pass 233. FIG. 23C shows FGHAZ 241 of tenth autogenous pass 233 highlighted in white. The position of CGHAZ line 240 demonstrates how FGHAZ 241 efficiently overlaps the original CGHAZ material of eighth primary pass 230, ninth primary pass 231, and tenth primary pass 232. When the beads are shaped and positioned as shown in FIG. 23A and as otherwise described herein, each autogenous pass is capable of low temperature reaustenization (i.e., a FGHAZ thermal cycle) of the CGHAZ material of several preceding primary passes. This type of geometry is termed "super-TEHAZ" to denote the particularly efficient superposition of the autogenous pass FGHAZs.

Applying autogenous passes overcomes the limitations of welding with only primary passes. Using autogenous passes greatly increases the reaustenization potential of the weld. Because the autogenous passes do not add filler material, they are capable of reaustenitizing CGHAZ material that would have been left behind by a primary pass. In other words, the heat source of an autogenous pass does not automatically move away (rise up the groove) from the CGHAZ material of interest. When one autogenous pass is applied to each primary pass, the number of reaustenization cycles imposed on the CGHAZ is, at least, doubled, as compared to application solely of primary passes. This is demonstrated by comparing the welds shown in FIGS. 18A and 22A. Likewise, if two autogenous passes are applied to each primary pass, the number of reaustenization cycles imposed on the CGHAZ is, at least, tripled. In the case of super-TEHAZ welding, the number of reaustenization cycles can be increased by many times with just a single autogenous pass applied to each primary pass.

Rogue Grains

Due to local material variations, some grains in the CGHAZ of a multipass steel weld will be very resilient in resisting grain refinement during reaustenization cycles. These grains are termed rogue grains and they are detrimental to toughness. For the purposes of the TEHAZ invention, a rogue grain is defined as a prior austenite grain that resists refinement during reaustenization and is larger than about five times the average grain size, this average being calculated for material in the immediate vicinity of the rogue grain in question. The term "immediate vicinity" is defined as the HAZ material surrounding the rogue grain, this material being within about ten prior austenite grains of the rogue grain. The average grain size can be calculated by methods well known to those skilled in the art of metallurgy, including without limitation, linear intercept methods. As used herein, the term "refinement" means reducing the size of one or more of the primary metallurgical units that defines the fineness or coarseness of the microstructure. For steel HAZs, such units include the average prior austenite grain size, the average size of the cementite particles, and the average size of the martensite-austenite constituent particles.

The number of reaustenization cycles required to eliminate rogue grains from a CGHAZ in steel depends on the steel being welded and the HAZ thermal cycles imposed by the welding procedure. Local variations in microstructure, dislocation density, chemistry, and thus grain boundary kinetics, control the microstructure's ability to nucleate new, refined grains during reaustenization. The amount of time spent above the $A_3$ temperature will also influence the formation of new, refined grains (longer times contributing to the breakdown of rogue grains). This aspect of the thermal cycle is controlled primarily by the welding heat input and the plate thickness as is known to those skilled in the art of welding engineering. For most applications the minimum number of reaustenization cycles required to eliminate rogue grains ranges from two to about four. Therefore, when welding according to the TEHAZ technique, each original CGHAZ must experience at least two complete reaustenization cycles; however, more may be needed depending on the steel, the welding procedure, and the toughness requirements. Because of efficient reaustenization, the super-TEHAZ method with one autogenous pass applied to each primary pass is typically sufficient to eliminate rogue grains.

TEHAZ Welding and Refinement Potential

One of the most debilitating features of a weld HAZ in steel is the coarse, non-uniform grain size and microstructure in the CGHAZ. The creation of large prior-austenite grains and constituents such as M-A (see Background section) are common near the weld fusion line and very detrimental to toughness. Average prior-austenite grain size in a typical CGHAZ can range from about 50 to about 200 microns depending, primarily, on the weld thermal cycle. TEHAZ welding can create a weld fusion line region (normally the location of the CGHAZ, IRCG, and SRCG) with a very refined, uniform microstructure. The average prior-austenite grain size near the weld fusion line in a TEHAZ weld can be made very small and uniform. The grains in the weld fusion line region can be reduced below 5 microns at which point the term prior-austenite grain size looses its traditional meaning, as explained in the following.

In a typical non-TEHAZ weld, the unit size of the M-A "grains" that form a necklace type arrangement in the IRCG (see, e.g., distribution of M-A islands 88 as discussed in the Background Section) ranges from about 1 micron to about 15 microns depending on the steel and the HAZ thermal cycle. In a TEHAZ weld, once the CGHAZ prior-austenite grain size is reduced below about 15 to 20 microns, the M-A can no longer create a necklace structure. By analogy it can be said that making a necklace becomes impractical (or impossible) when the diameter of the necklace approaches the size of the elements that are strung on the necklace. Also, the refined grain structure created by TEHAZ welding creates an extremely large number of high angle grain boundaries and, thus, a large number of potential nucleation sites near the weld fusion line. This has the effect of breaking up, and refining the microstructure and, in particular, the M-A becomes refined and uniformly dispersed.

Root and Capping Passes

It will be obvious to anyone skilled in the art of welding engineering that passes near the root and cap (i.e., near the plate surfaces) are more challenging with respect to TEHAZ thermal cycling. If a single-sided weld is made, as shown in FIGS. 16A through 19B, and 21A through 23C, then some regions of the root pass CGHAZ near the plate surface will be difficult to superimpose with second, third, fourth, etc. pass HAZ isotherms. In this case, several measures can be taken to provide sufficient TEHAZ treatment to the root. One method is to apply several autogenous passes to the primary root pass. Another method is to apply several autogenous passes, but to the opposite side of the plate. In other words the root pass can be autogenously treated from the "backside", a term known to those skilled in the art of welding engineering. An alternative to single-sided welding is two-sided welding. If a TEHAZ weld is made from both sides of the plate, then the first-side root area will be suitably treated during application of the second-side root area. This eliminates the need to conduct extra treatment in root areas as was mentioned for single-sided welding.

With respect passes near the cap of a weld, tendencies for bead shape change due to differences in local heat sink must be accommodated. Passes near the cap tend to widen as they approach the surface. To accomplish effective TEHAZ treatment in the cap area, this widening should be limited such that the HAZ isotherms are suitably superimposed according to principles described in this invention. Bead shape in the cap region and the tendency to widen can be controlled by adjustment of the welding parameters, for example, without limiting this invention, by reducing the welding voltage, by reducing the amount of side-to-side electrode oscillation, and by reducing the welding current which limits the degree to which the corners of the weld groove at the plate surface are melted, all of which are known to those skilled in the art of welding engineering. Also, some of the final capping passes can be treated with multiple autogenous passes to produce the desired amount of TEHAZ thermal cycling.

One important issue with respect to TEHAZ treatment of passes near a plate surface is associated with material constraint. The following discussion concerns surface breaking defects. Stress concentrators whose tips lie near the plate surface experience lower material constraint as compared to flaws with tips that penetrate deeper. Shallow flaws experience less driving force for fracture as compared to deeper flaws. Therefore, in plate that is thicker than about one-half inch, and with all other aspects like microstructure and residual stresses being equal, the toughness response for shallow flaws will be higher than for deep flaws. This is also reflected in standard equations for stress intensity that show higher intensities as the crack depth increases. The significance for applying the TEHAZ method is that near-surface HAZ regions are inherently tougher. For many applications, the fact that near-surface HAZ regions receive less TEHAZ treatment (unless special measures are taken) may be of no consequence. Near-surface HAZs offer an exception to the general rule of two or more complete reaustenization cycles to eliminate rogue grains. For most, if not all applications, the application of the same number of passes per layer throughout a weld can still produce adequate toughness.

Testing TEHAZ Welds for Fracture Toughness

So that the full potential of TEHAZ welding is realized without undue economic impact, it is important to use an accurate toughness testing method to guide the selection of a specific TEHAZ procedure. This ensures that decisions are made with regard to actual toughness differences and are not obscured by data scatter. Any of several standard fracture mechanics test methods such as the crack tip opening displacement (CTOD) method or the J-integral method, as is known to those experienced in experimental mechanics, can be used to assess the HAZ fracture toughness of a TEHAZ weld. An important aspect is that a fatigue crack be used as the stress concentrator instead of a blunt notch. It is preferred that such fracture mechanics tests be used to compare either TEHAZ welds with each other or TEHAZ welds to non-TEHAZ welds. While it is possible to use a blunt notch test like the Charpy-V-notch to show general trends, a more quantitative assessment is possible with tests like the CTOD or J-integral.

Figure 24:
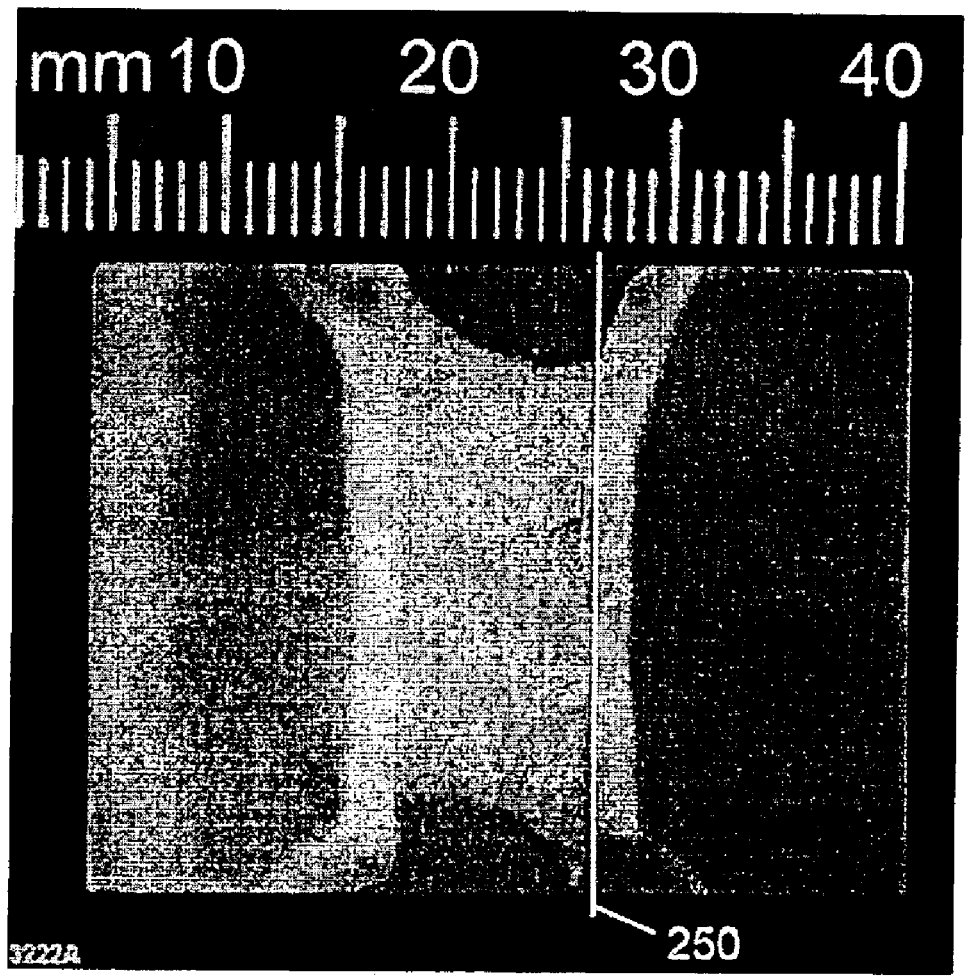
FIG. 24 shows a cross-section of a TEHAZ weld produced according to this invention.

As is known to those skilled in the art of welding engineering and experimental fracture mechanics, assessing the fracture toughness of a weld HAZ in steel can be challenging because of the inhomogeneous microstructure. One advantage of the TEHAZ technique is that the microstructural area of interest (the weld fusion line area) is oriented nearly perpendicular to the plate surface and this provides an easy target for the precrack. The preferred specimen geometry is either a B×B or B×2B configuration with the precrack oriented in the through-thickness direction (see British Standard BS7448, REF. number 15, for a description of these terms and the test method). FIG. 24 shows a cross section of an actual TEHAZ weld and on this section is marked a line 250 that shows the desired position of the fatigue precrack. By conducting a number of tests at a fixed temperature (for example, the service temperature) or over a range of temperatures to establish a toughness transition curve, the fracture toughness of a TEHAZ weld can be assessed.

With respect to precrack orientation in the CTOD or J-integral test, either a through-thickness or surface notch geometry is possible. The advantage of the through thickness geometry for testing weld HAZs is that, on average, more of the microstructure of interest can be sampled in a single test than if surface notches are used. This is particularly the case with a TEHAZ weld where the fusion line is nearly perpendicular to the plate surface. The surface notch orientation requires that the precrack be precisely located with respect to depth and side-to-side positioning. Typically, it is easier to place a longer length of the crack front in the HAZ region of interest when using the through-thickness orientation. This is useful when testing the CGHAZ.

It is tempting to criticize the through thickness orientation because it doesn't replicate the geometry of typical surface cracks experienced in service. It also tends to produce (on average) lower fracture toughness results if local brittle zones are present. However, it has been shown that for structural steels where cleavage is a concern, once enough surface notch fracture mechanics tests are conducted, the lower bound data (the data of interest from the standpoint of cleavage) provides the same toughness characterization as for the through thickness orientation. See REF. number 1 for discussion on this topic.

Designing a TEHAZ Weld

Once the toughness requirement is known for a particular application, several trial TEHAZ welds can be made (with varying degrees of thermal enhancement of the HAZ) and tested. By trial and error, the most economic TEHAZ weld for a particular application can be determined. In designing a TEHAZ weld, several tradeoffs must be considered. From the standpoint of productivity and cost, it is generally desirable to weld with higher deposition rates and thicker beads. But as discussed previously, thicker beads tend to be detrimental for HAZ toughness. The best approach is, generally, to use the maximum bead thickness and as few autogenous passes as possible that is capable of producing the required toughness.

Although the details of TEHAZ welding need to be tailored to each specific application, there are some items that can be generically stated: The weld bevel geometry should be that of a narrow groove, butt weld similar to that shown in FIG. 13. The weld groove should be produced in a one pass per layer sequence. Each layer should consist of one primary pass (filler added) and one or more autogenous passes. Each layer should be substantially symmetric about the weld centerline. Each pass (primary or autogenous) should have the same basic shape as the previous pass in order to maximize the superposition of the HAZ isotherms. The $A_1$ isotherm of the autogenous passes should substantially coincide with the $A_3$ isotherm of the previous pass. Generally, the original CGHAZ material must be completely reaustenitized two or more times in order to substantially eliminate rogue grains.

Alternative TEHAZ Procedures

The basic concepts of TEHAZ welding can be manipulated to accommodate a wide variety of applications. For example, suppose a particular application involves relatively thick plate (one or two inches thick or greater), and it is known that only shallow, surface-breaking flaws are likely to be experienced during fabrication or in service. In this situation one might reason that the surface regions of the weldment (the regions that might experience surface breaking flaws) require high toughness, but that the central regions do not. The TEHAZ invention can be manipulated to make a weld specific for this application. In this case, the central weld region could be made without the TEHAZ technique while the surface layers are made using the TEHAZ technique. The TEHAZ technique can be applied to different areas of a weld and to different degrees. Any manipulations of the TEHAZ technique are within the scope of the basic TEHAZ invention. The examples provided herein are not intended to be limiting. Additionally, while the present invention has been described in terms of one or more preferred embodiments, it is to be understood that other modifications may be made without departing from the scope of the invention, which is set forth in the claims below.

Glossary of Terms $A_1$: $A_1$ transformation temperature;

$A_3$: $A_3$ transformation temperature;

$A_1$ transformation temperature: the temperature at which austenite begins to form during heating or, in the case of cooling, the temperature at which the austenite to ferrite plus cementite transformation is substantially complete;

$A_3$ transformation temperature: the temperature at which transformation of ferrite to austenite is substantially completed during heating or, in the case of cooling, the temperature at which austenite begins to transform to ferrite plus cementite;

autogenous bead: weld pass applied without filler material added;

CGHAZ: coarse grain HAZ;

coarse grain HAZ: area of the supercritically heated heat-affected-zone of a steel (i.e., that portion of the HAZ that was heated above the $A_3$ temperature) that contains prior austenite grains having a size of about 50 microns or larger;

dislocation: a linear discontinuity in an otherwise regular lattice structure of a crystal;

DBTT: ductile-to-brittle transition temperature;

ductile-to-brittle transition temperature: a mathematical description of the position of the transition region on the temperature axis (delineates the two fracture regimes in structural steels; at temperatures below the DBTT, failure tends to occur by low energy cleavage (brittle) fracture, while at temperatures above the DBTT, failure tends to occur by high energy ductile fracture);

FGHAZ: fine grain HAZ;

fine grain HAZ: area of the supercritically heated heat-affected-zone of a steel (i.e., that portion of the HAZ that was heated above the $A_3$ temperature) that contains prior austenite grains having a size smaller than about 50 microns;

HAZ: heat-affected zone;

heat-affected zone: a region adjacent to fused weld metal where the base metal has experienced microstructural changes due to the heat from welding;

high angle grain boundary: a grain boundary that separates two adjacent grains whose crystallographic orientations differ by more than about 8°;

ICHAZ: intercritical HAZ;

RCG: intercritically reheated CGHAZ;

LBZs: local brittle zones;

local brittle zones: a term used to describe small HAZ regions with low toughness;

M-A: martensite-austenite constituent;

narrow groove: a weld groove that is smaller in width than the typical one-sided, butt-weld preparation with a 60 degree included angle (as illustrated, e.g., in FIGS. 13 and 15);

nucleation site: the location of a stable complex of atoms during phase transformation;

primary bead: weld bead deposited with filler material;

one bead per layer: a welding technique whereby the weld groove (including narrow grooves and small sidewall bevel angles (e.g., less than about 10°)) is filled by depositing successive layers whereby each layer is comprised of a primary bead and at least one autogenous bead;

prior-austenite: austenite that existed during a previous thermal cycle;

prior-austenite grain size: the average size of the austenite grains that existed during a previous thermal cycle;

reaustenization cycle: period during which a material is reheated above the $A_3$ transformation temperature after cooling to a temperature below the $A_3$ transformation temperature;

refinement: reducing the size of one or more of the primary metallurgical units that defines the fineness or coarseness of the microstructure. For steel HAZs, such units include the average prior austenite grain size, the average size of the cementite particles, and the average size of the martensite-austenite constituent particles.

rogue grain: a prior austenite grain that resists refinement during reaustenization and is larger than about five times the average grain size, this average being calculated for HAZ material in the immediate vicinity of the rogue grain in question. The immediate vicinity being the HAZ material within about ten prior austenite grains of the rogue grain;

SCHAZ: subcritical HAZ;

SRCG: subcritically reheated CGHAZ;

TEHAZ: thermally enhanced heat affected zone and also used as a acronym for the welding method of this invention;

weld centerline: in a weld groove, a line within the weld groove that is equal distance from each of said sidewalls (as illustrated, e.g., in FIG. 14);

weld joint: A welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weld joint, varies depending on factors known to those skilled in the art, for example, without limitation, the width of the weld joint, the size of the item that was welded, the number of weld joints required to fabricate the item, and the distance between weld joints;

weld fusion line: a line that represents the general position of the interface between the weld metal and the base metal.

TABLE OF REFERENCES

REF. 1: D. P. Fairchild, "Local Brittle Zones in Structural Welds," *Welding Metallurgy of Structural Steels*, The Metallurgical Society, Warrendale, Pa., 1987, pp. 303–318;

REF. 2: P. L. Harrison and P. H. M. Hart, "HAZ Toughness of Thick Section Structural Steels," Proc. Int'l Conf. on Weld Failures, The Welding Institute, London, November 1988, paper 45;

REF. 3: S. E. Webster and E. F. Walker, "The Significance of Local Brittle Zones to the Integrity of Large Welded Structures," Proc. $7^{th}$ Int. Conf. Offshore Mech. and Arctic Eng., Houston, Tex., February 1988, pp. 395–403;

REF. 4: D. P. Fairchild, "Fracture Toughness Testing of Weld Heat-Affected Zones in Structural Steels," *Fatigue and Fracture Testing of Weldments*, ASTM STP 1058, H. I. McHenry and J. M Potter, Eds., ASTM, Philadelphia, 1990, pp. 117–141;

REF. 5: D. P. Fairchild, "A Study Concerning the Heat Affected Zone Toughness of Microalloyed Steels," PhD. Dissertation, The Ohio State University, Columbus, Ohio, June 1995;

REF. 6: D. P. Fairchild, et al., "A Study Concerning Intercritical HAZ Microstructure and Toughness in HSLA Steels," Welding Jour., December 1991, pp. 321–329;

REF. 7: K. Uchino and Y. Ohno, "A Study of Intercritical HAZ Embrittlement in HT50 for Offshore Structural Use," Proc. 6th Int'l. Conf. Offshore Mech. and Arctic Eng., Houston, Tex., Mar. 1–7, 1987, pp. 159–165;

REF 8: J. H. Chen, et al., "Micro-Fracture Behaviour Induced by M-A Constituent (Island Martensite) in Simulated Welding Heat Affected Zone of HT80 High Strength Low Alloyed Steel," Acta. Metall., Vol. 32, No. 10, 1984, pp. 1779–1788;

REF. 9: S. Aihara and T. Haze, "Influence of High Carbon Martensite Islands on Crack-Tip Opening Displacement Value of Weld Heat-Affected Zone in HSLA Steels," TMS Annual Meeting, Phoenix, Ariz., Jan. 25–28, 1988;

REF. 10: T. Haze and S. Aihara, "Influence of Toughness and Size of Local Brittle Zone on HAZ Toughness of HSLA Steels," Proc. of the 7th Int'l. Conf. on Offshore Mech. and Arctic Eng., Houston, Tex., Feb. 7–12, 1988, pp. 515–523;

REF. 11: C. L. Davis and J. E. King, "Cleavage Initiation in the Intercritically Reheated Coarse-Grained Heat-Affected Zone: Part I. Fractographic Evidence," Met. Trans. A, Vol. 25A, March 1994, pp. 563–573;

REF. 12: A. C. deKoning, et al., "Feeling Free Despite LBZ", Proc. of the 7th Int'l. Conf. on Offshore Mech. and Arctic Eng., Houston, Tex., Feb. 7–12, 1988, pp. 161–179;

REF. 13: K. Olsen, D. L. Olsen, and N. Christensen, "Weld Bead Tempering of the Heat Affected Zone", Scandinavian Journal of Metallurgy, 11(1982), pp. 163–168;

REF. 14: P. J. Alberry, "Simple Test Reveals Level of Two-Layer Refinement", Welding and Metal Fabrication, November 1981, pp. 543–547; and REF. 15: British Standards Institution, "Fracture Mechanics Toughness Tests, Part 2. Method for Determination of $K_{1c}$, Critical CTOD and Critical J Values of Welds in Metallic Materials", BS7448: Part 2: 1997.

We claim:

1. A method of welding two pieces of metal to produce a weld joint with a heat-affected-zone having excellent fracture toughness, said method comprising the steps of:
   (a) positioning said two pieces of metal so as to form a groove; and
   (b) applying two or more weld pass layers within said groove to produce said weld joint whereby each said weld pass layer is comprised of one primary bead and at least one autogenous bead, and whereby:
      (i) each said weld pass layer is substantially symmetric about a weld centerline;
      (ii) each said primary bead has an associated primary $A_1$ isotherm and an associated primary $A_3$ isotherm and each of said autogenous beads has an associated autogenous $A_1$ isotherm and an associated autogenous $A_3$ isotherm; and
      (iii) the autogenous $A_1$ isotherm of each said autogenous bead substantially coincides with (a) the primary $A_3$ isotherm of the primary bead immediately preceding said autogenous bead or (b) the autogenous $A_3$ isotherm of the autogenous bead immediately preceding said autogenous bead.

2. The method of claim 1 wherein each said autogenous bead has substantially the same geometric shape as (a) the primary bead immediately preceding said autogenous bead or (b) the autogenous bead immediately preceding said autogenous bead.

3. The method of claim 1 wherein said steps are performed such that said heat-affected-zone is substantially free of rogue grains.

4. The method of claim 1 wherein each said primary bead and each said autogenous bead has an original coarse grain heat-affected-zone area when originally applied, and further wherein each said original coarse grain heat-affected-zone area, except for the original coarse grain heat-affected-zone areas of the last two beads applied during the method, is subjected to at least two reaustenization cycles.

5. The method of claim 1 wherein said groove has two sidewalls, each of said sidewalls having a bevel angle of less than about 10°.

* * * * *